(12) United States Patent (10) Patent No.: US 12,686,122 B2
Ohnishi et al. (45) Date of Patent: Jul. 21, 2026

(54) FUNCTION MANAGEMENT SYSTEM, FUNCTION MANAGEMENT METHOD, AND STORAGE MEDIUM

(71) Applicants: KEIO UNIVERSITY, Tokyo (JP); Motion Lib, inc., Kawasaki (JP)

(72) Inventors: Kouhei Ohnishi, Kanagawa (JP); Takahiro Mizoguchi, Kanagawa (JP); Genki Kokubun, Kanagawa (JP); Wataru Iida, Kanagawa (JP)

(73) Assignees: KEIO UNIVERSITY, Tokyo (JP); MOTION LIB, INC., Kanagawa (JP)

( * ) Notice: Subject to any disclaimer, the term of this patent is extended or adjusted under 35 U.S.C. 154(b) by 136 days.

(21) Appl. No.: 18/288,242

(22) PCT Filed: Mar. 30, 2022

(86) PCT No.: PCT/JP2022/016372
§ 371 (c)(1),
(2) Date: Oct. 25, 2023

(87) PCT Pub. No.: WO2022/230594
PCT Pub. Date: Nov. 3, 2022

(65) Prior Publication Data
US 2024/0208050 A1 Jun. 27, 2024

(30) Foreign Application Priority Data
Apr. 26, 2021 (JP) ................................. 2021-074421

(51) Int. Cl.
| | |
|---|---|
| *G06F 3/01* | (2006.01) |
| *B25J 3/00* | (2006.01) |
| *B25J 9/16* | (2006.01) |

(52) U.S. Cl.
CPC ............... *B25J 9/1633* (2013.01); *B25J 3/00* (2013.01); *G06F 3/016* (2013.01)

(58) Field of Classification Search
CPC ............ G06F 3/016; B25J 9/1633; G25J 3/00
(Continued)

(56) References Cited

U.S. PATENT DOCUMENTS

| | | | | |
|---|---|---|---|---|
| 6,580,417 B2 * | 6/2003 | Rosenberg | ............. | G01B 5/008 345/157 |
| 8,508,469 B1 * | 8/2013 | Rosenberg | ............. | G01B 21/04 345/156 |

(Continued)

FOREIGN PATENT DOCUMENTS

| | | |
|---|---|---|
| JP | H06209902 A | 8/1994 |
| JP | H08145007 A | 6/1996 |

(Continued)

OTHER PUBLICATIONS

International Search Report (ISR) (and an English language translation thereof) dated Jun. 21, 2022, issued in International Application No. PCT/JP2022/016372.

(Continued)

*Primary Examiner* — Christopher B Shin
(74) *Attorney, Agent, or Firm* — Holtz, Holtz & Volek PC

(57) ABSTRACT

A function management system according is communicatively connected to a client system and includes a request receiving unit and a function assignment unit. The request receiving unit receives an execution request for one process of a plurality of processes based on the control parameters for transmitting force tactile sensation. The function assignment unit identifies the functions required to execute the one process, and assigns each of the identified functions to either the client system or the function management system by which the function is to be implemented.

12 Claims, 11 Drawing Sheets

FIFTH FUNCTIONAL CONFIGURATION

(58) Field of Classification Search
USPC ........................................................ 710/14
See application file for complete search history.

(56) References Cited

U.S. PATENT DOCUMENTS

| | | | |
|---|---|---|---|
| 2007/0112466 A1 | 5/2007 | Ohnishi et al. | |
| 2009/0110533 A1 | 4/2009 | Jinno | |
| 2010/0010671 A1 | 1/2010 | Miyamoto | |
| 2015/0137727 A1 | 5/2015 | Furutani et al. | |
| 2016/0207196 A1 | 7/2016 | Ohnishi et al. | |
| 2019/0143510 A1 | 5/2019 | Ohnishi et al. | |
| 2020/0376681 A1 | 12/2020 | Ohnishi et al. | |
| 2021/0107134 A1 | 4/2021 | Shimono et al. | |
| 2021/0282795 A1 | 9/2021 | Shimono et al. | |
| 2021/0334336 A1* | 10/2021 | Ohnishi | G05B 19/408 |
| 2022/0134542 A1 | 5/2022 | Ohnishi et al. | |

FOREIGN PATENT DOCUMENTS

| | | | |
|---|---|---|---|
| JP | 2000047567 A | 2/2000 | |
| JP | 2002312003 A | 10/2002 | |
| JP | 2006106858 A | 4/2006 | |
| JP | 2006107167 A | 4/2006 | |
| JP | 2007274783 A | 10/2007 | |
| JP | 2009107095 A | 5/2009 | |
| JP | 2009279699 A | 12/2009 | |
| JP | 2009289179 A | 12/2009 | |
| JP | 2010020650 A | 1/2010 | |
| WO | 2005109139 A1 | 11/2005 | |
| WO | 2006107167 A1 | 10/2006 | |
| WO | 2013108356 A1 | 7/2013 | |
| WO | 2015041046 A1 | 3/2015 | |
| WO | 2021025087 A1 | 2/2021 | |
| WO | 2021172572 A1 | 9/2021 | |
| WO | 2021172580 A1 | 9/2021 | |
| WO | 2021200881 A1 | 10/2021 | |

OTHER PUBLICATIONS

Written Opinion dated Jun. 21, 2022, issued in International Application No. PCT/JP2022/016372.

Japanese Office Action (and an English language translation thereof) dated May 12, 2026, issued in corresponding Japanese Application No. 2023-517210.

* cited by examiner

Figure 4:
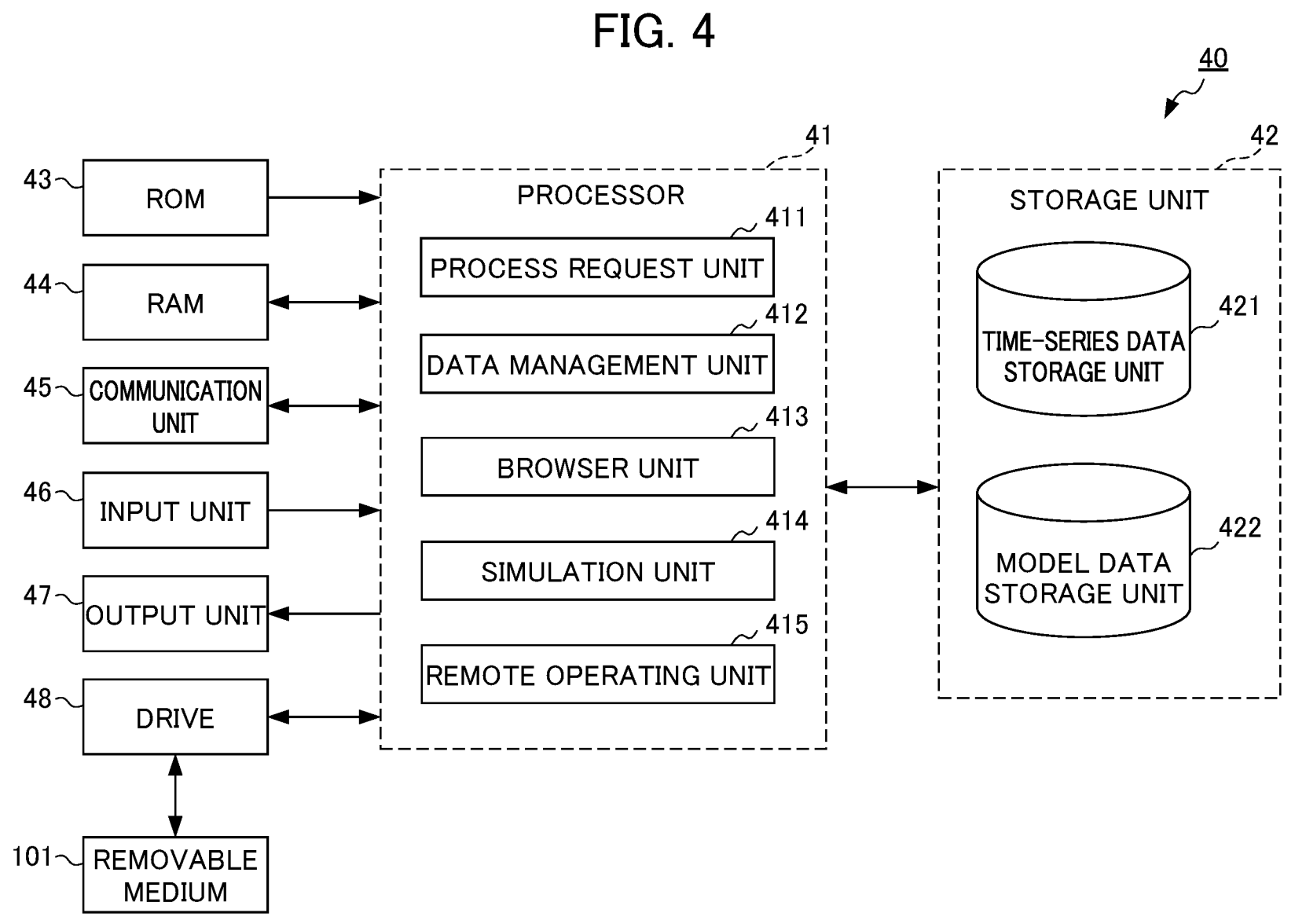

STORAGE UNIT

- TIME-SERIES DATA STORAGE UNIT — 421
- MODEL DATA STORAGE UNIT — 422

41

PROCESSOR

- PROCESS REQUEST UNIT — 411
- DATA MANAGEMENT UNIT — 412
- BROWSER UNIT — 413
- SIMULATION UNIT — 414
- REMOTE OPERATING UNIT — 415

43 — ROM

44 — RAM

45 — COMMUNICATION UNIT

46 — INPUT UNIT

47 — OUTPUT UNIT

48 — DRIVE

101 — REMOVABLE MEDIUM

FIRST FUNCTIONAL CONFIGURATION

FIG. 7

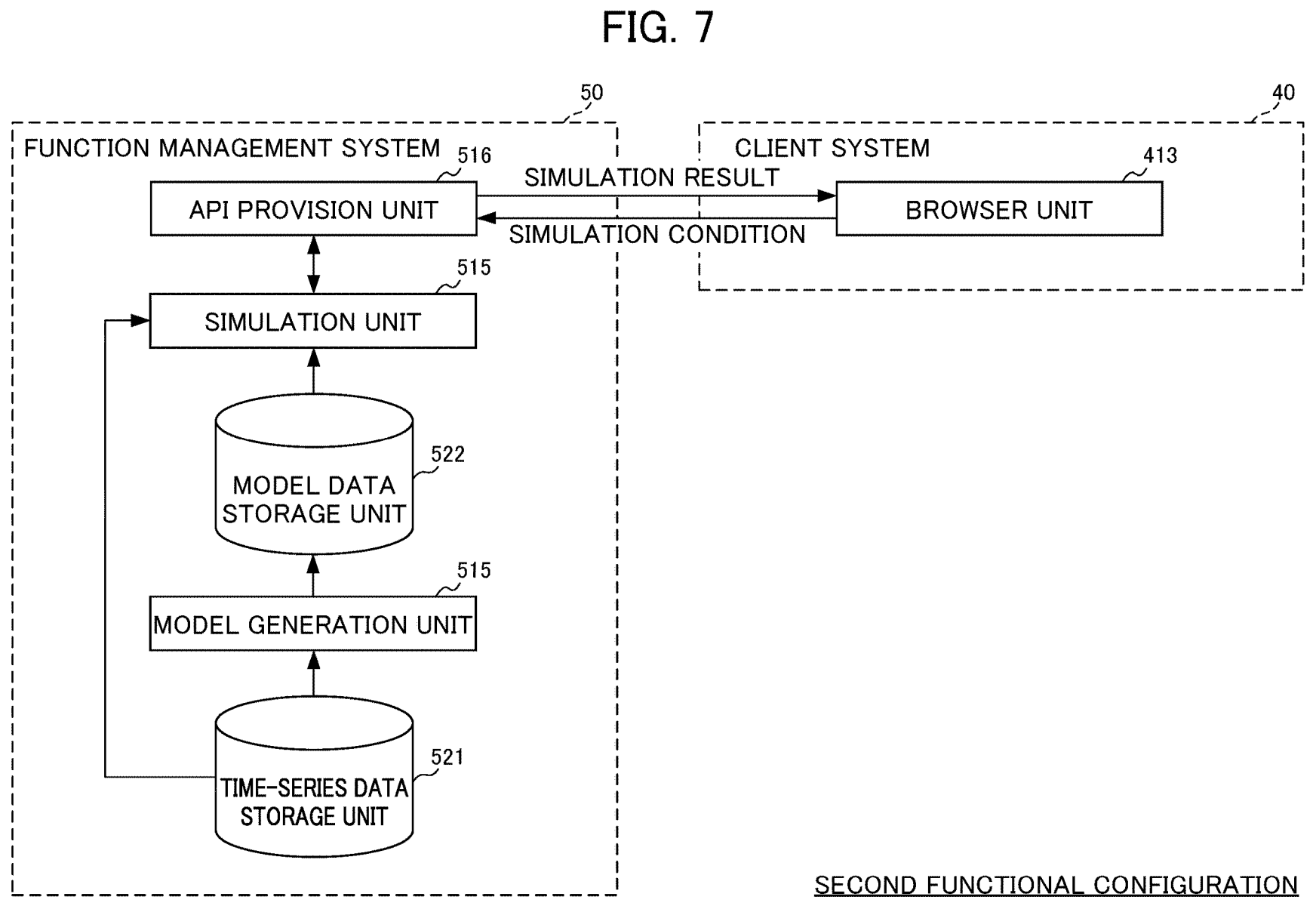

CLIENT SYSTEM — 40

BROWSER UNIT — 413

SIMULATION RESULT

SIMULATION CONDITION

FUNCTION MANAGEMENT SYSTEM — 50

API PROVISION UNIT — 516

SIMULATION UNIT — 515

MODEL DATA STORAGE UNIT — 522

MODEL GENERATION UNIT — 515

TIME-SERIES DATA STORAGE UNIT — 521

SECOND FUNCTIONAL CONFIGURATION

THIRD FUNCTIONAL CONFIGURATION

FOURTH FUNCTIONAL CONFIGURATION

FIG. 10

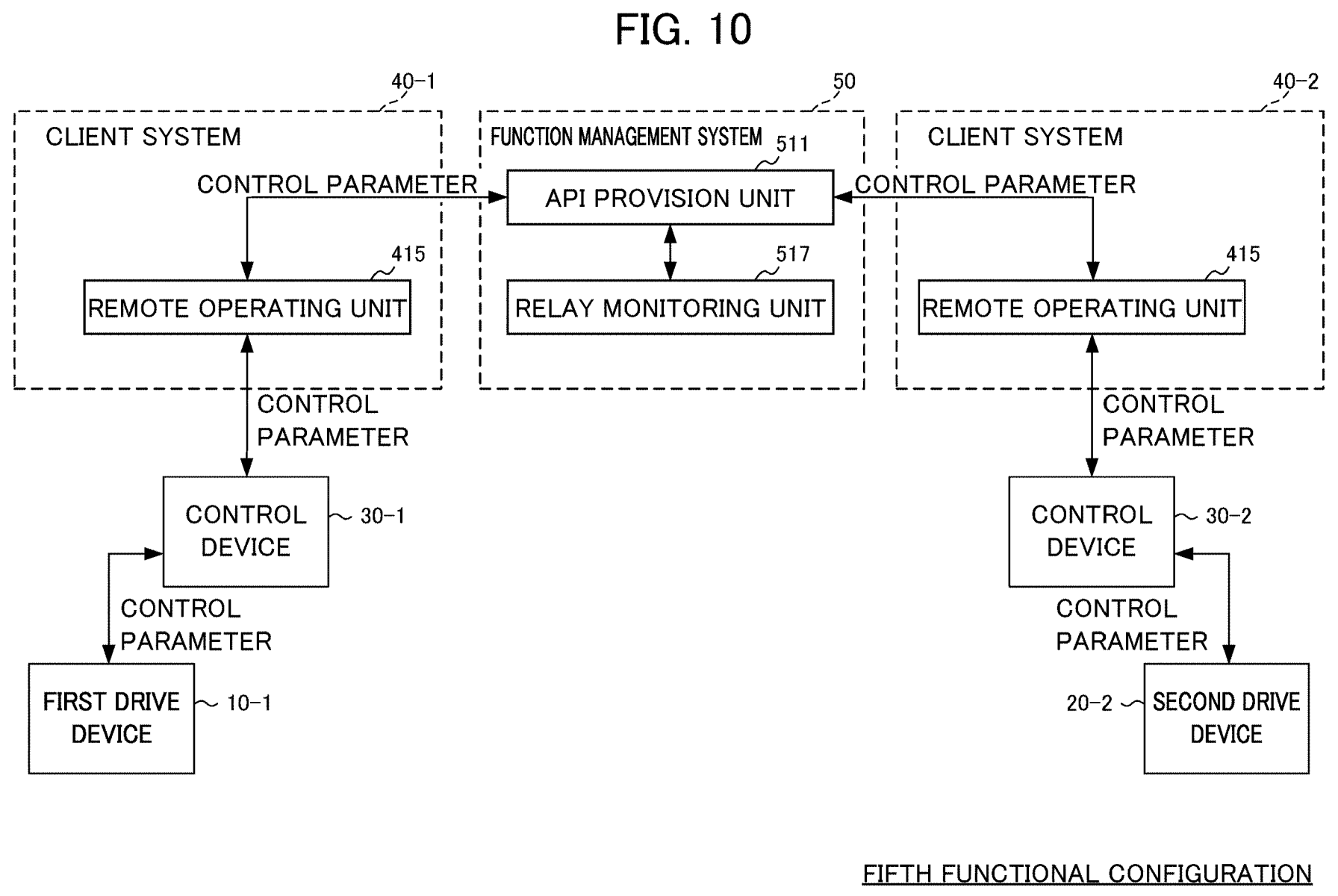

CLIENT SYSTEM 40-2

CONTROL PARAMETER

REMOTE OPERATING UNIT 415

CONTROL PARAMETER

CONTROL DEVICE 30-2

CONTROL PARAMETER

SECOND DRIVE DEVICE 20-2

FUNCTION MANAGEMENT SYSTEM 50

API PROVISION UNIT 511

RELAY MONITORING UNIT 517

CLIENT SYSTEM 40-1

CONTROL PARAMETER

REMOTE OPERATING UNIT 415

CONTROL PARAMETER

CONTROL DEVICE 30-1

CONTROL PARAMETER

FIRST DRIVE DEVICE 10-1

FIFTH FUNCTIONAL CONFIGURATION

FIG. 11

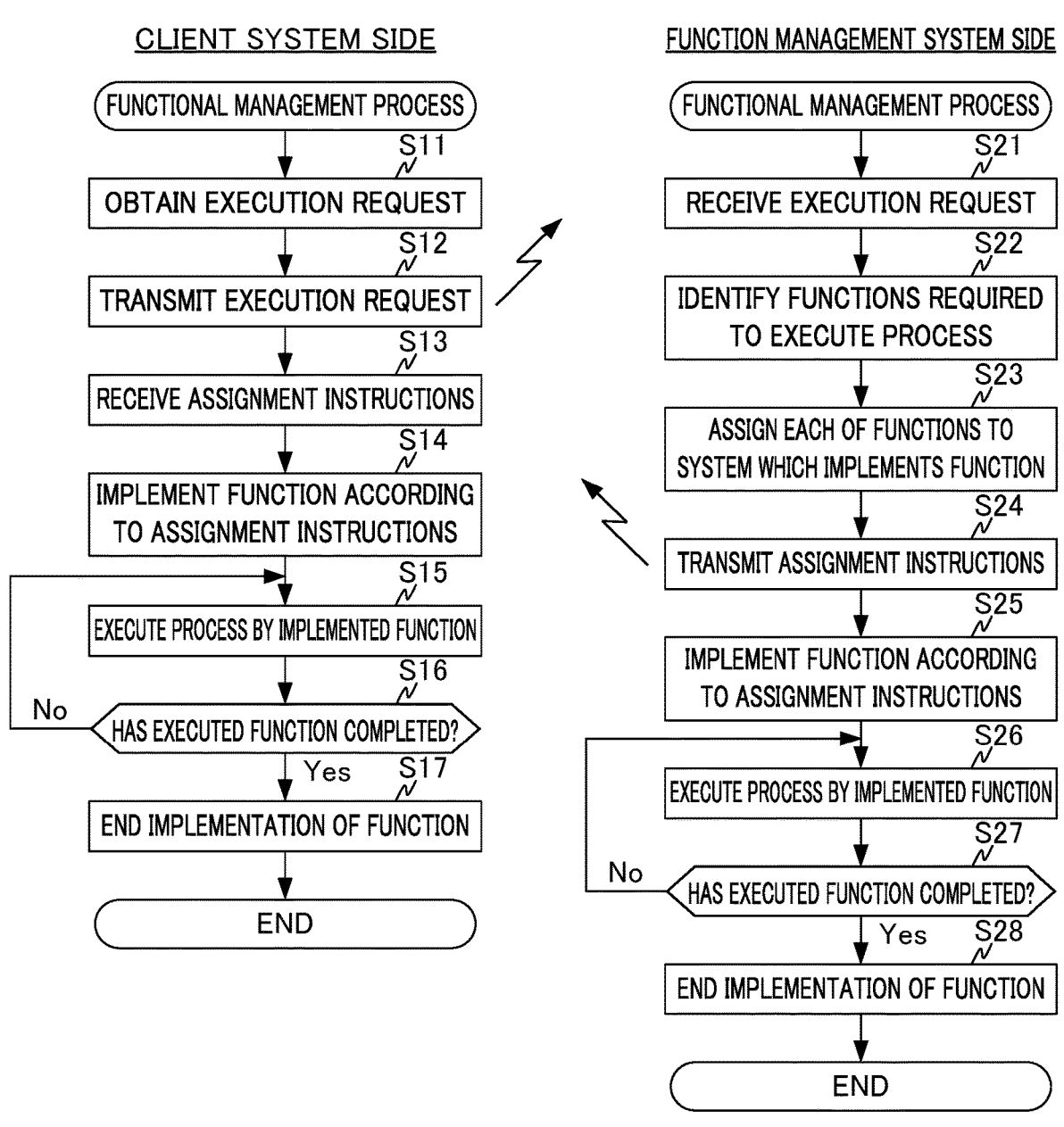

CLIENT SYSTEM SIDE

FUNCTIONAL MANAGEMENT PROCESS

S11
OBTAIN EXECUTION REQUEST

S12
TRANSMIT EXECUTION REQUEST

S13
RECEIVE ASSIGNMENT INSTRUCTIONS

S14
IMPLEMENT FUNCTION ACCORDING TO ASSIGNMENT INSTRUCTIONS

S15
EXECUTE PROCESS BY IMPLEMENTED FUNCTION

S16
HAS EXECUTED FUNCTION COMPLETED?
No
Yes

S17
END IMPLEMENTATION OF FUNCTION

END

FUNCTION MANAGEMENT SYSTEM SIDE

FUNCTIONAL MANAGEMENT PROCESS

S21
RECEIVE EXECUTION REQUEST

S22
IDENTIFY FUNCTIONS REQUIRED TO EXECUTE PROCESS

S23
ASSIGN EACH OF FUNCTIONS TO SYSTEM WHICH IMPLEMENTS FUNCTION

S24
TRANSMIT ASSIGNMENT INSTRUCTIONS

S25
IMPLEMENT FUNCTION ACCORDING TO ASSIGNMENT INSTRUCTIONS

S26
EXECUTE PROCESS BY IMPLEMENTED FUNCTION

S27
HAS EXECUTED FUNCTION COMPLETED?
No
Yes

S28
END IMPLEMENTATION OF FUNCTION

END

FUNCTION MANAGEMENT SYSTEM, FUNCTION MANAGEMENT METHOD, AND STORAGE MEDIUM

TECHNICAL FIELD

The present invention relates to a function management system, a function management method and a storage medium.

BACKGROUND ART

An existing technique digitizes force tactile sensation (e.g., hardness and softness of an object) upon contact with an object into data to implement transmission of the force tactile sensation between devices, and analyzes or reproduces the data.

An example of such a technique is disclosed in PTL 1. With the technique disclosed in PTL 1, force tactile sensation perceived when an object is gripped by a robot manipulator is digitized into data, thereby transmitting the force tactile sensation to a multi-finger device worn by a user.

CITATION LIST

Patent Literature

[PTL 1]
  Japanese Unexamined Patent Application Publication No. 2009-289179

SUMMARY OF INVENTION

Technical Problem

However, with a general technique as disclosed in PTL 1, it is only assumed that a specific process (e.g., a process of transmitting force tactile sensation in real time) is performed, and for this purpose, a specific functional configuration is constructed.

However, processes related to force tactile sensation are diverse, and a specific functional configuration is not necessarily optimal for all of these processes.

Solution to Problem

A function management system communicatively connected to a client system includes:
  a request receiver that receives an execution request for one process of a plurality of processes based on a control parameter for transmitting force tactile sensation; and
  an assigner that identifies functions required to execute the one process and assigns each of the identified functions to either the client system or the function management system by which the function is to be implemented.

Advantageous Effects of Invention

According to the present invention, when a process related to force tactile sensation is performed, a function can be dynamically assigned so that the process can be executed more appropriately.

BRIEF DESCRIPTION OF DRAWINGS

FIG. 4 is a block diagram showing the hardware configuration and the functional configuration of the client system 40.

FIG. 7 is a block diagram showing a second functional configuration that is one of specific examples of functional configuration.

FIG. 10 is a block diagram showing a fifth functional configuration that is one of specific examples of functional configuration.

FIG. 11 is a flowchart illustrating the flow of a functional management process executed by the information processing system S.

DESCRIPTION OF EMBODIMENTS

Figure 1:
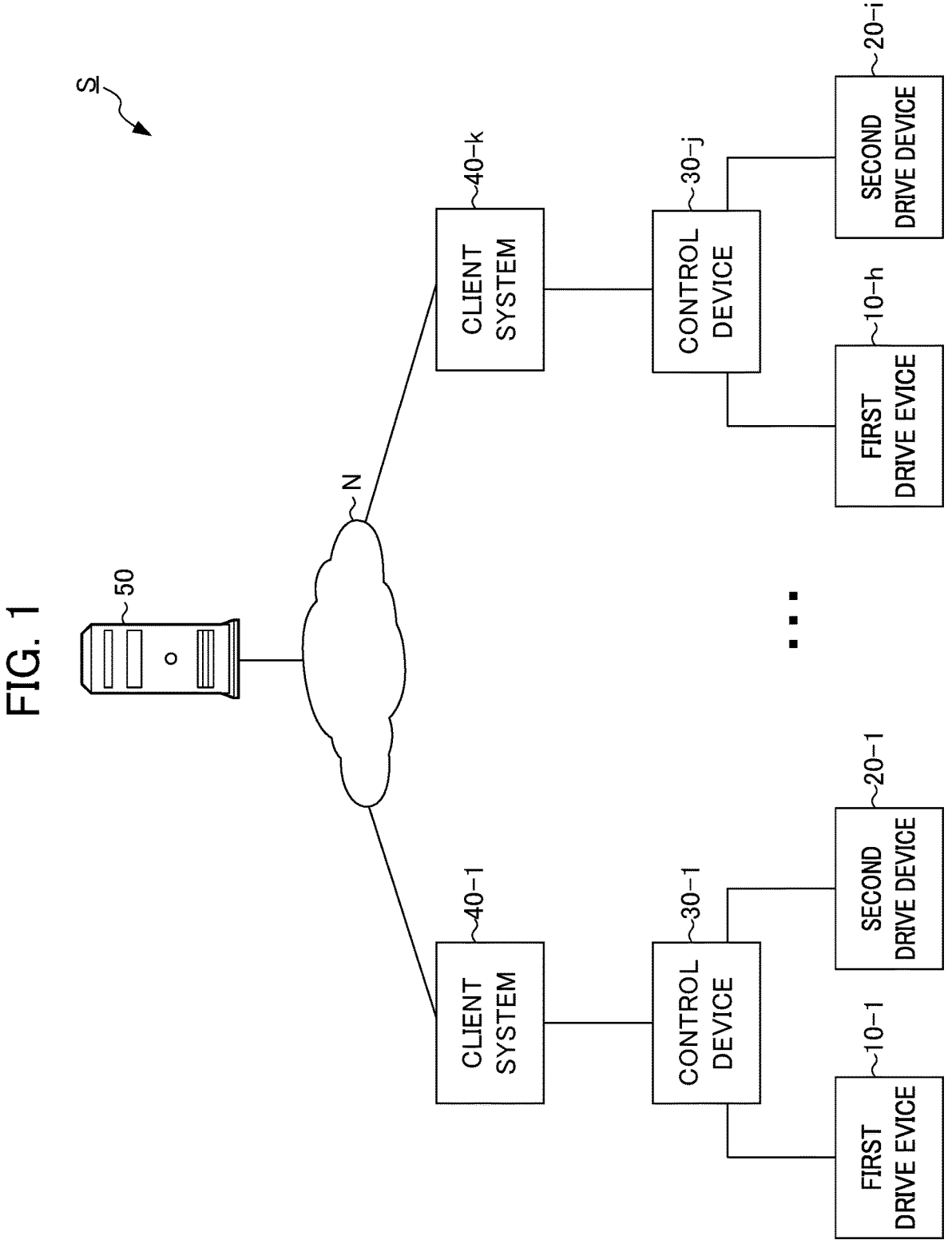
FIG. 1 is a block diagram showing the entire configuration of an information processing system S according to the present embodiment.

An example of an embodiment of the present invention will be described hereinafter with reference to the accompanying drawings.
[System Configuration]
FIG. 1 is a block diagram showing the entire configuration of an information processing system S according to the present embodiment. As shown in FIG. 1, the information processing system S includes a plurality of sets each consisting of a first drive device 10, a second drive device 20, a control device 30, and a client system 40; and a function management system 50.

The control device 30 is communicatively connected to the first drive device 10, the second drive device 20 and the client system 40 by a wire or wirelessly. In addition, the client system 40 is communicatively connected to the function management system 50 via a network N by a wire or wirelessly. The network N is implemented by, for example, a network such as a LAN (Local Area Network) and the Internet.

Also, h, i, j and k appended to the ends of the symbols of the first drive device 10, the second drive device 20, the control device 30, and the client system 40 are each any integer value greater than or equal to 1, and may be the same value or may be different values. In other words, in each set, all of the first drive device 10, the second drive device 20, the control device 30 and the client system 40 may be included, or only part of them may be included. For example, some of the client system 40, the control device 30, the first drive device 10 or the second drive device 20 may be included depending on the set.

In such a system configuration, the first drive device 10 operates as a master device, thereby driving a first mechanism that receives an operation from a user. In contrast, the second drive device 20 operates as a slave device, thereby driving a second mechanism that performs an operation involving contact with an object.

In this case, the control device 30 performs control (bilateral control) over transmission of force tactile sensation between the first mechanism driven by the first drive device 10 and the second mechanism driven by the second drive device 20. Thus, an operation (input of a position and a force) of a user to the first mechanism is transmitted to the second mechanism, and a reaction force (response of a position and a force) from the second mechanism is transmitted to the first mechanism.

In addition, each control device 30 obtains control parameters for transmitting force tactile sensation in time series in such bilateral control. Each control device 30 transmits the control parameters obtained in time series to the client system 40.

The client system 40 implements various functions based on the function assignment instructions from the function management system 50. For example, the client system 40 transmits the time-series control parameters received from each control device 30 to the function management system 50 as time-series data based on the function assignment instructions from the function management system 50.

The function management system 50 manages to determine which of the function management system 50 itself or the client system 40 implements various functions to execute various processes. Herein, the function management system 50 is not only assumed to perform a specific process like a general technique. The function management system 50 has diverse processes related to force tactile sensation, and it is assumed that a specific functional configuration is not necessarily optimal for all of these processes.

Under this assumption, the function management system 50 receives an execution request for one process of a plurality of processes based on the control parameters for transmitting force tactile sensation. The function management system 50 then identifies the functions required to execute the one process, and assigns each of the identified functions to either the client system 40 or the function management system 50 by which the function is to be implemented. In other words, the function management system 50 determines the system as appropriate that implements the function according to the process to be executed this time.

Therefore, the function management system 50 makes it possible to solve the problem that when a process related to force tactile sensation is performed, a function is dynamically assigned so that the process can be executed more appropriately.

[Device Configuration]

Next, the configuration of each device included in the information processing system S will be described.

Figure 2:
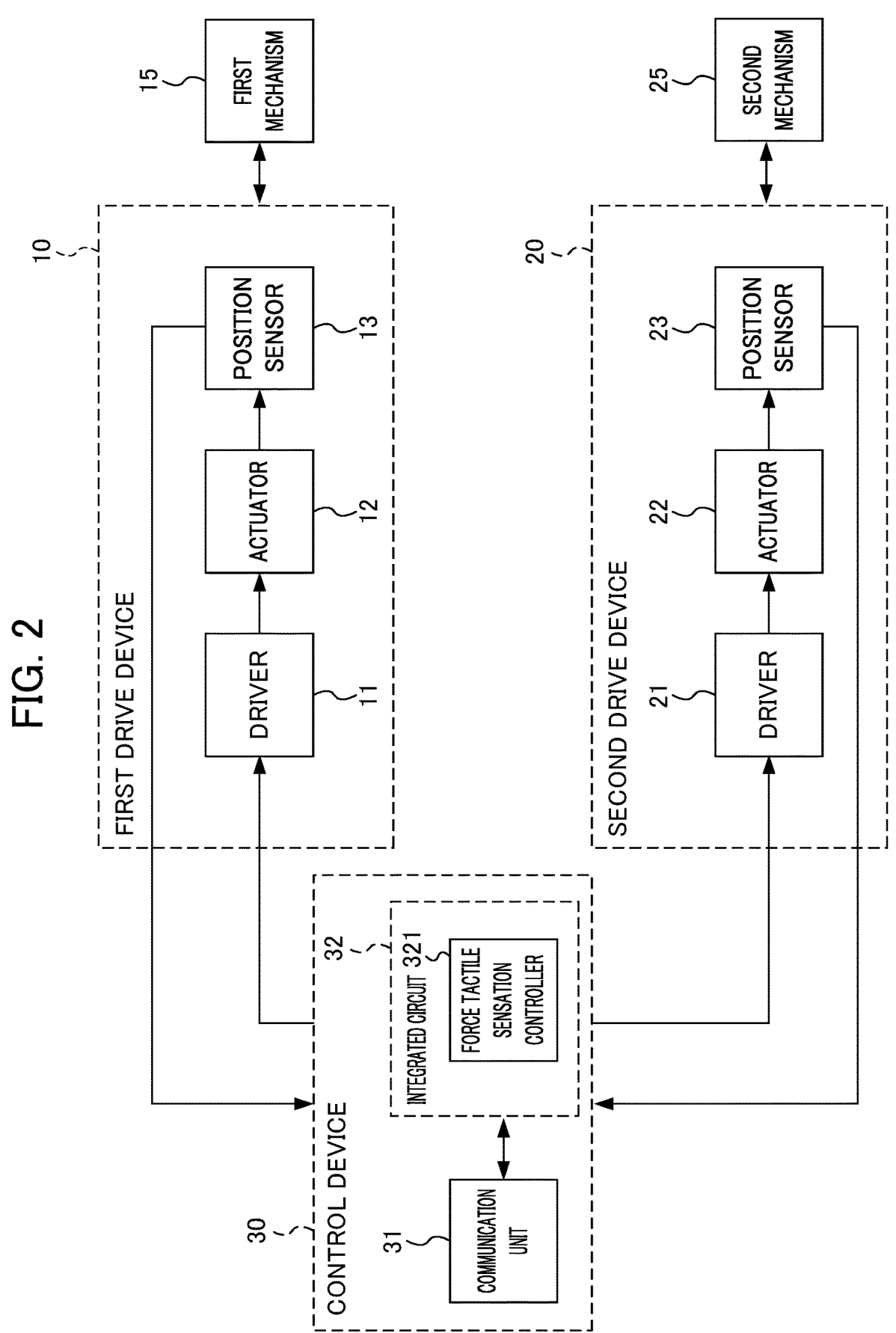
FIG. 2 is a block diagram showing the hardware configuration and the functional configuration of the first drive device 10, the second drive device 20, and the control device 30.

FIG. 2 is a block diagram showing the hardware configuration and the functional configuration of the first drive device 10, the second drive device 20, and the control device 30.

As shown in FIG. 2, the first drive device 10 includes an actuator 12 that drives the first mechanism 15, a driver 11 that drives the actuator 12, and a position sensor 13 that detects the position of a movement object moved by the actuator 12. The second drive device 20 includes an actuator 22 that drives the second mechanism 25, a driver 21 that drives the actuator 22, and a position sensor 23 that detects the position of a movement object moved by the actuator 22.

In this case, the position of a movement object detected by the position sensor 13 is, for example, the position of a predetermined part of the first mechanism 15, and the position of a predetermined part of a user who operates the first mechanism 15. The position of a movement object detected by the position sensor 23 is, for example, the position of a predetermined part of the second mechanism 25, and the position of a predetermined part of a target object which is to be touched, and gripped, processed or moved by the second mechanism 25.

However, in the present embodiment, instead of the positions of these movement objects, the rotation angle of the output shaft of each actuator may be detected by a rotary encoder built-in the actuator. In other words, in the present embodiment, the concept of position is supposed to include angle (e.g., the rotation angle of the output shaft of an actuator), and information related to position is supposed to include position, angle, velocity, angular velocity, acceleration and angular acceleration. Position and velocity (or acceleration) or angle and angular velocity (or angular acceleration) are parameters replaceable by a calculus operation, thus when a process related to position or angle is performed, the process can be performed after the position or angle is replaced by velocity or angular velocity as appropriate.

The first mechanism 15 is a mechanism that functions as an operational tool that receives an operation of a user, and its shape and structure are not limited to particular ones. For example, the first mechanism 15 is implemented by a controller equipped with a variable unit that receives an operation of a user, or a hand/finger shaped device worn by a user. The second mechanism 25 is a mechanism that comes into contact with an object to grip, process, or move the object, and its shape and structure are not limited to particular ones. For example, the second mechanism 25 is implemented by a robot manipulator that comes into contact with an object to grip or move the object, or a robot arm equipped with (or mounted with a tool) a tool for processing an object.

The control device 30 includes a communication unit 31 and an integrated circuit 32.

The communication unit 31 controls communication to be performed with another device (e.g., the client system 40).

The integrated circuit 32 is an integrated circuit (IC: integrated circuit), and causes a force tactile sensation controller 321 to function. In the integrated circuit 32, the position sensor 13, the driver 11, the position sensor 23, and the driver 21 are connected to each other via a signal line. On this connection path, a circuit to implement sending and receiving of signals, such as a D/A (digital to analog) converter circuit and an A/D (analog to digital) converter circuit, and a pulse counter or the like are disposed as appropriate. Sending and receiving of signals via the signal line may be implemented by parallel communication, or implemented by serial communication.

In such a configuration, the force tactile sensation controller 321 outputs a control command to the driver 11 or the driver 21 based on the information on the position detected by the position sensor 13 or the position sensor 23, thereby implementing control over transmission of force tactile sensation between the first drive device 10 which is a master device, and the second drive device 20 which is a slave device.

As a control method for transmission of force tactile sensation performed by the force tactile sensation controller 321, two control methods are assumed: "actual operation transmission control" and "reproduction data transmission control".

Here, the actual operation transmission control is a control method by which both the master device (here, the first drive device 10), and the slave device (here, the second drive device 20) are actually driven, and force tactile sensation accompanying the actual drive is transmitted based on the positions detected in real time by the position sensors (e.g., the position sensor 13 and the position sensor 23) of the actually driven master device and slave device.

In contrast, the reproduction data transmission control is a control method by which only one of the master device (here, the first drive device 10), and the slave device (here, the second drive device 20) is actually driven, and reproduced force tactile sensation is transmitted based on the position detected in real time by the position sensor (e.g., one of the position sensor 13 and the position sensor 23) of the actually driven one of the master device and the slave device, and on the reproduction data generated to reproduce the operation of the one of the master device and the slave device.

Specifically, when the actual operation transmission control is performed, the force tactile sensation controller 321 performs control over transmission of force tactile sensation bi-directionally between the actuator 12 of the first drive device 10 and the actuator 22 of the second drive device 20. For this purpose, the force tactile sensation controller 321 obtains the position (specifically, the position or the angle) of a movement object moved by the actuator 12 from the position sensor 13, and the position (specifically, the position or the angle) of a movement object moved by the actuator 22 from the position sensor 23.

In contrast, when the reproduction data transmission control is performed, the force tactile sensation controller 321 performs control to reproduce the operation in accordance with the reproduction data in the actuator 22 (or the actuator 12) based on the reproduction data for controlling the operation of the second drive device 20 (or the reproduction data for controlling the operation of the first drive device 10). In short, the force tactile sensation controller 321 performs control over transmission of force tactile sensation based on the reproduction data to the actuator 22 (or the actuator 12). For this purpose, the force tactile sensation controller 321 obtains the position (specifically, the position or the angle) of a movement object moved by the actuator 22 (or the actuator 12) from the position sensor 23 (or the position sensor 13), and obtains reproduction data for controlling the operation of the second drive device 20 (reproduction data for controlling the operation of the first drive device 10). The reproduction data is obtained from the client system 40 through communication.

In this manner, in the actual operation transmission control and the reproduction data transmission control, the position (angle) and the reproduction data obtained by the force tactile sensation controller 321 are used as reference values for controlling the operation of the first drive device 10 and the second drive device 20 in a control algorithm for transmission of force tactile sensation. The control algorithm for transmission of force tactile sensation will be described in detail with reference to FIG. 3.

Figure 3:
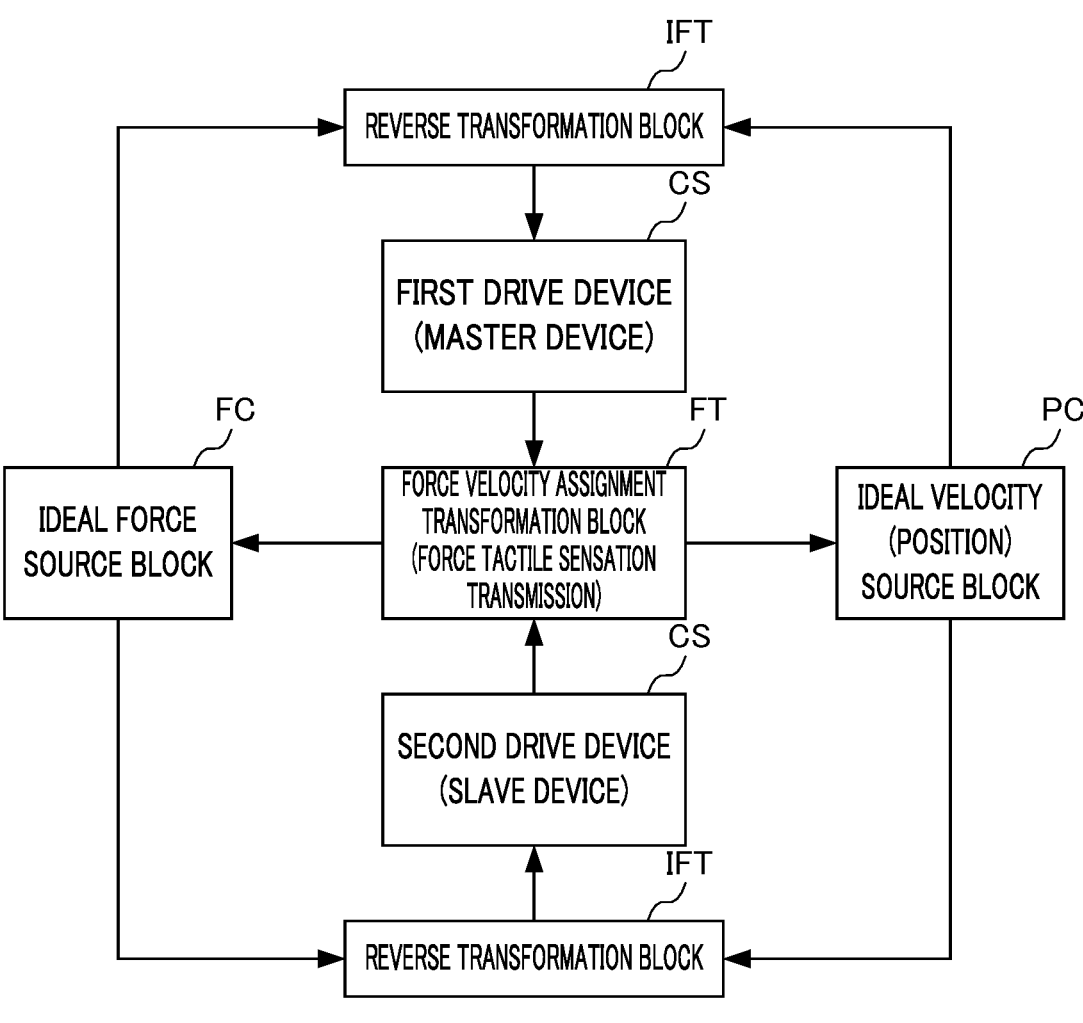
FIG. 3 is a block diagram showing a control algorithm to transmit force tactile sensation in the force tactile sensation controller 321.

FIG. 3 is a block diagram showing a control algorithm to transmit force tactile sensation in the force tactile sensation controller 321.

As shown in FIG. 3, the control algorithm implemented in the force tactile sensation controller 321 is expressed as a control law including a functional force velocity assignment transformation block FT, at least one of an ideal force source block FC or an ideal velocity (position) source block PC, and a reverse transformation block IFT. Note that in the present embodiment, a control target system CS is constituted by the first drive device 10 and the second drive device 20.

The functional force velocity assignment transformation block FT is a block that defines the transformation of a control energy to a region of velocity (position) and force which are set according to the function of the control target system CS. Specifically, in the functional force velocity assignment transformation block FT, values (reference values) which serve as a reference of the function of the control target system CS, and a coordinate transformation with an input of the current positions (or the current angles) of the actuator 12 and the actuator 22 are defined. In general, the coordinate transformation transforms an input vector with elements of reference value and current position (current angle) to an output vector consisting of positions (angles) for calculating a control target value of position (angle), and transforms an input vector with elements of reference value and the current force to an output vector consisting of forces for calculating a control target value of force.

A force tactile sensation transmission function between the first drive device 10 and the second drive device 20 can be implemented by setting the coordinate transformation in the functional force velocity assignment transformation block FT to content indicating the force tactile sensation transmission function, and the operation of transmitting force tactile sensation can be reproduced by the second drive device 20 without using the first drive device 10. Scaling of position (angle) or force can be performed by setting coefficients to the elements of a transformation matrix in the coordinate transformation in the functional force velocity assignment transformation block FT.

Specifically, in the present embodiment, in the functional force velocity assignment transformation block FT, variables (variables on the actual space) of the actuator 12 and the actuator 22 as single bodies are "transformed" to a variable group (variables on the space after coordinate transformation) of the entire system that represents the force tactile sensation transmission function, and the control energy is assigned to control energy for position (angle) and control energy for force. In other words, the coordinate transformation set in the functional force velocity assignment transformation block FT transforms the coordinates (oblique coordinates) of an actual space in which position (angle) and force are related to each other into the coordinates (orthogonal coordinates) of a virtual space in which position (angle) and force are independent from each other. Thus, as compared to when control is performed with the variables (variables on the actual space) of the actuator as a single body as they are, it is possible to provide the control energy for position (angle) and the control energy for force independently, in other words, to control position (angle) and force independently.

In the present embodiment, here, when the position (angle) and the force output by the first drive device 10 are controlled, a state value in the space after a coordinate transformation can be calculated under the condition that the difference in positions (angles) is zero, and the sum of forces is zero (equal forces are output in opposite directions) between inputs of the position (angle) of a member moved by the actuator 12 as well as the force calculated from the position (angle), and reference values which serve as reference for control of position (angle) and force.

However, in the actual operation transmission control, the reference values which serve as reference for control of position (angle) and force are the position (angle) of a member moved by the actuator 22 in the second drive device 20, and the force calculated from the position (angle).

In the reproduction data transmission control, when the operation of the first drive device 10 is reproduced by reproduction data, the reference values which serve as reference for control of position (angle) and force are reproduction data which is obtained from the client system 40 for controlling the operation of the first drive device 10. Note that when the operation of the second drive device 20 is reproduced by the reproduction data, the first drive device 10 does not perform any operation.

Similarly, in the present embodiment, here, when the position (angle) and the force output by the second drive device 20 are controlled, a state value in the space after a coordinate transformation can be calculated under the condition that the difference in positions (angles) is zero, and the sum of forces is zero (equal forces are output in opposite directions) between inputs of the position (angle) of a member moved by the actuator 22 as well as the force calculated from the position (angle), and reference values which serve as reference for control of position (angle) and force.

However, in the actual operation transmission control, the reference values which serve as reference for control of position (angle) and force are the position (angle) of a member moved by the actuator 12 in the first drive device 10, and force calculated from the position (angle).

In the reproduction data transmission control, when the operation of the second drive device 20 is reproduced by reproduction data, the reference values which serve as reference for control of position (angle) and force are reproduction data which is obtained from the client system 40 for controlling the operation of the second drive device 20. Note that when the operation of the first drive device 10 is reproduced by the reproduction data, the second drive device 20 does not perform any operation.

The ideal force source block FC is a block that performs calculation in a region of force in accordance with the coordinate transformation defined by the functional force velocity assignment transformation block FT. In the ideal force source block FC, a target value related to force is set for calculation performed based on the coordinate transformation defined by the functional force velocity assignment transformation block FT. The target value is set as a fixed value or a variable value according to the function to be implemented. For example, when a function similar to the function indicated by a reference value is implemented, zero is set as a target value, and when scaling is performed, an enlarged or reduced value of information indicating the function represented by a reference value can be set. The ideal force source block FC can set an upper limit value for the energy of force, determined by calculation in a region of force. Setting an upper limit value for the energy of force imposes restrictions on a contact force when the second mechanism 25 comes into contact with an object, thus damage to the second mechanism 25 and the object due to excessively strong pressing of the second mechanism 25 against the object can be prevented.

The ideal velocity (position) source block PC is a block that performs calculation in a region of position (angle) in accordance with the coordinate transformation defined by the functional force velocity assignment transformation block FT. In the ideal velocity (position) source block PC, a target value related to position (angle) is set for calculation performed based on the coordinate transformation defined by the functional force velocity assignment transformation block FT. The target value is set as a fixed value or a variable value according to the function to be implemented. For example, when a function similar to the function indicated by a reference value is implemented, zero is set as a target value, and when scaling is performed, an enlarged or reduced value of information indicating the function to be reproduced can be set. The ideal velocity (position) source block PC can set an upper limit value for the energy of position (angle), determined by calculation in a region of position (angle). Setting an upper limit value for the energy of position (angle) imposes restrictions on the distance of movement of the second mechanism 25, thus damage to the second mechanism 25 and the object due to excessive movement of the second mechanism 25 can be prevented.

The reverse transformation block IFT is a block that reversely transforms the value of a region of position (angle) and force into the value (e.g., a voltage value or a current value) of a region input to the control target system CS (in other words, determines a command value in the actual space).

Under such a control algorithm, when the actual operation transmission control is performed, the detection values of position (angle) in time series detected by the position sensor 13 and the position sensor 23 are input to the force tactile sensation controller 321. The detection values of position (angle) in time series indicate the operation of the actuator 12 and the actuator 22, and the force tactile sensation controller 321 applies a coordinate transformation for force tactile sensation transmission to the input positions (angles) and a force derived from these positions (angles).

Under such a control algorithm, when the reproduction data transmission control is performed, the detection values of position (angle) in time series detected by the position sensor 23 (or the position sensor 13) are input to the force tactile sensation controller 321. The detection values of position (angle) in time series indicate the operation of the actuator 22 (or the actuator 12). In addition, the values of position (angle) in time series in the reproduction data are input to the force tactile sensation controller 321. The values of position (angle) in time series indicate the operation of the actuator 22 (or the actuator 12 in the reproduction data) in the reproduction data. The force tactile sensation controller 321 applies a coordinate transformation for force tactile sensation transmission to the input positions (angles) and a force derived from these positions (angles).

Note that in this case, the values of time-series data of the control parameter for position (angle) and force may be input as the reproduction data. In this case, the force tactile sensation controller 321 applies a coordinate transformation for force tactile sensation transmission based on the values of time-series data of the control parameters for position (angle) and force in the reproduction data, the positions (angles) input from the position sensor 23 and a force derived from the positions (angles).

The force tactile sensation controller 321 transmits force tactile sensation by such control, and transmits, to the client system 40, the control parameters (here, the control parameters for position (angle) and force in time series for transmitting force tactile sensation to the first drive device 10 and the second drive device 20) in time series calculated to transmit force tactile sensation.

Note that regarding the transmission of the control parameters in time series, the transmission may be made at each time of sampling by the position sensor 13 and the position sensor 23, and calculation of a control parameter accompanying the sampling, or at each time of sampling and calculation of a control parameter, the control parameters in time series may be stored, and sent collectively at a timing when the operation is completed. In this case, after transmission of the control parameters in time series, the force tactile sensation controller 321 may discard the stored time-series data to reduce the storage capacity of the force tactile sensation controller 321.

FIG. 4 is a block diagram showing the hardware configuration and the functional configuration of the client system 40.

As shown in FIG. 4, the client system 40 includes a processor 41, a storage unit 42, a ROM (Read Only Memory) 43, a RAM (Random Access Memory) 44, a communication unit 45, an input unit 46, an output unit 47, and a drive 48.

The processor 41 is comprised of an arithmetic unit such as a CPU (Central Processing Unit), and executes various processes in accordance with a program recorded on the ROM 43, or a program loaded from the storage unit 42 to the RAM 44.

Data necessary for the processor 41 to execute various processes is also stored in the RAM 44 as appropriate.

The processor 41 is connected to the ROM 43, and RAM 44 each other via a bus which is not illustrated. The bus is further connected to the storage unit 42, the communication unit 45, the input unit 46, the output unit 47, and the drive 48.

The storage unit 42 is comprised of a hard disk or a DRAM (Dynamic Random Access Memory), and stores various data. The communication unit 45 controls the communication performed with other devices.

The input unit 46 is comprised of various buttons, and receives various information in response to an instruction operation. The output unit 47 is comprised of a display and a speaker, and outputs images and sound.

On the drive 48, a removable medium 101 is mounted as appropriate, which includes a magnetic disk, an optical disk, a magneto-optical disk, or a semiconductor memory. A program read from the removable medium 101 by the drive 48 is installed in the storage unit 42 as necessary.

The client system 40 having such a hardware configuration performs "functional management process" by collaborating with the function management system 50.

Here, the functional management process is a series of processes that assign each of functions required to execute one process for which an execution request has been received to either the client system 40 or the function management system 50 by which the function is to be implemented, and the one process is executed by the assigned function.

When the functional management process is performed, a process request unit 411, a data management unit 412, a browser unit 413, a simulation unit 414, and a remote operating unit 415 function in the processor 41. A time-series data storage unit 421, and a model data storage unit 422 are formed in the data storage unit 42.

In also a case not particularly mentioned below, data necessary to implement a process is sent and received between these functional blocks at an appropriate timing as needed.

Note that in the functional management process, as described above, the assigned function is dynamically changed depending on for which one of the processes, an execution request has been received. Thus, all of these illustrated functional blocks are not necessarily implemented at the same time.

The process request unit 411 sends, to the function management system 50, an execution request for one process of a plurality of processes based on the control parameters for transmitting force tactile sensation. Which one of the processes for which an execution request is sent is determined, for example, based on the operation instructions of a user to the input unit 46.

The data management unit 412 manages various data. For example, the data management unit 412 sends and receives time-series data of the control parameters for transmitting force tactile sensation, and the model data between the control device 30 and the function management system 50. The data management unit 412 stores the time-series data in the time-series data storage unit 421 as necessary. In other words, the time-series data storage unit 421 serves as a storage unit to store time-series data. Similarly, the data management unit 412 stores model data in the model data storage unit 422 as necessary. In other words, the model data storage unit 422 serves as a storage unit to store model data. Whether or not the data is stored in these data storage units is determined based on the function assignment instructions provided by the client system 40. Here, as mentioned above, the time-series data is time-series data of control parameters for position (angle) and force. The model data is data, such as an environmental model and an operating model, generated in the function management system 50. The details of the model data will be described below.

Note that the data management unit 412 adds supplemental information (hereinafter referred to as "label information") to time-series data as necessary, then sends and stores the time-series data, the supplemental information including identifiers to identify the first drive device 10 and the second drive device 20, attributes (e.g., the type, the number of axes, the range of movement, and the torque output range of each device) of the first drive device 10 and the second drive device 20, the execution date and time, and operation contents of the operation executed by the first drive device 10 and the second drive device 20 under the control of the control device 30, and the type of object contacted in the operation. Thus, the client system 40, the function management system 50, and a user who operates these can perform various processes by referring to the label information.

The browser unit 413 allows a user to browse a simulation result which is related to control over transmission of force tactile sensation and received from the function management system 50. The simulation is made by executing an operation such as gripping of a virtual object with a virtual slave device based on the operation of a virtual user to a virtual master device in a virtual space implemented by arithmetic processing of a computer, for example. In this case, the operation of the virtual user to the virtual master device is transmitted to the virtual slave device, and input of a reaction force from the virtual object to the virtual slave device is transmitted to the master device.

Browsing of such a simulation result can be implemented, for example, by representing the operation of the virtual master device and the virtual slave device using patterned computer graphics, and displaying what is represented on a display included in the output unit 47. Note that in this case, a virtual first mechanism, a virtual second mechanism, and a virtual object to be touched may be represented using patterned computer graphics, and what is represented may be included in display. In addition, change in the control parameters for transmitting force tactile sensation to the virtual master device and the virtual slave device may be represented by a graph where the vertical axis is time and the horizontal axis is value of control parameter, for example, and the graph may be included in the display.

Consequently, even when the control device 30 and others are not connected to the client system 40, an operation result can be identified without an actual operation of a user.

The simulation unit 414 performs a simulation related to control over transmission of force tactile sensation on the client system 40. The simulation in the simulation unit 414 is partly different from the simulation in the function management system 50, and the control parameters for the master device (here, the first drive device 10) actually driven or the slave device (here, the second drive device 20) actually driven are reflected on the simulation.

Specifically, the simulation unit 414 performs a simulation by assuming that the position (specifically, the position or the angle) of a movement object moved by the actuator (the actuator 12 or the actuator 22) corresponds to the master device or the slave device in a virtual space, the position being detected by the position sensor (the position sensor 13 or the position sensor 23) of the master device (here, the first drive device 10) actually driven or the slave device (here, the second drive device 20) actually driven.

Thus, a user who operates, for example, the master device (here, the first drive device 10) actually driven can experience an operation in a pseudo manner in a virtual space based on an environmental model.

Note that the conditions (e.g., selection of model data to be used for a simulation) for performing a simulation related to the control over transmission of force tactile sensation in the client system 40 and the function management system 50 are determined based on the operation instructions of a user to the input unit 46 of the client system 40, and an input unit 56 of the function management system 50, for example.

The remote operating unit 415 implements the actual operation transmission control between itself and another client system 40 (e.g., a remotely located client system 40 connected via the network N and the function management system 50). For example, the first drive device 10 connected to a client system 40 via a control device 30 serves as the master device, and the second drive device 20 connected to another client system 40 via a control device 30 serves as the slave device. The remote operating units 415 of these client systems 40 send and receive the control parameters for transmitting force tactile sensation to and from each other, thereby executing control over transmission of force tactile sensation bi-directionally between the actuator 12 of the first drive device 10, serving as the master device and the actuator 22 of the second drive device 20, serving as the slave device.

Consequently, the actual operation transmission control can be implemented, for example, between the first drive device 10 and the second drive device 20 which are not connected to the same control device 30 and remotely located.

Figure 5:
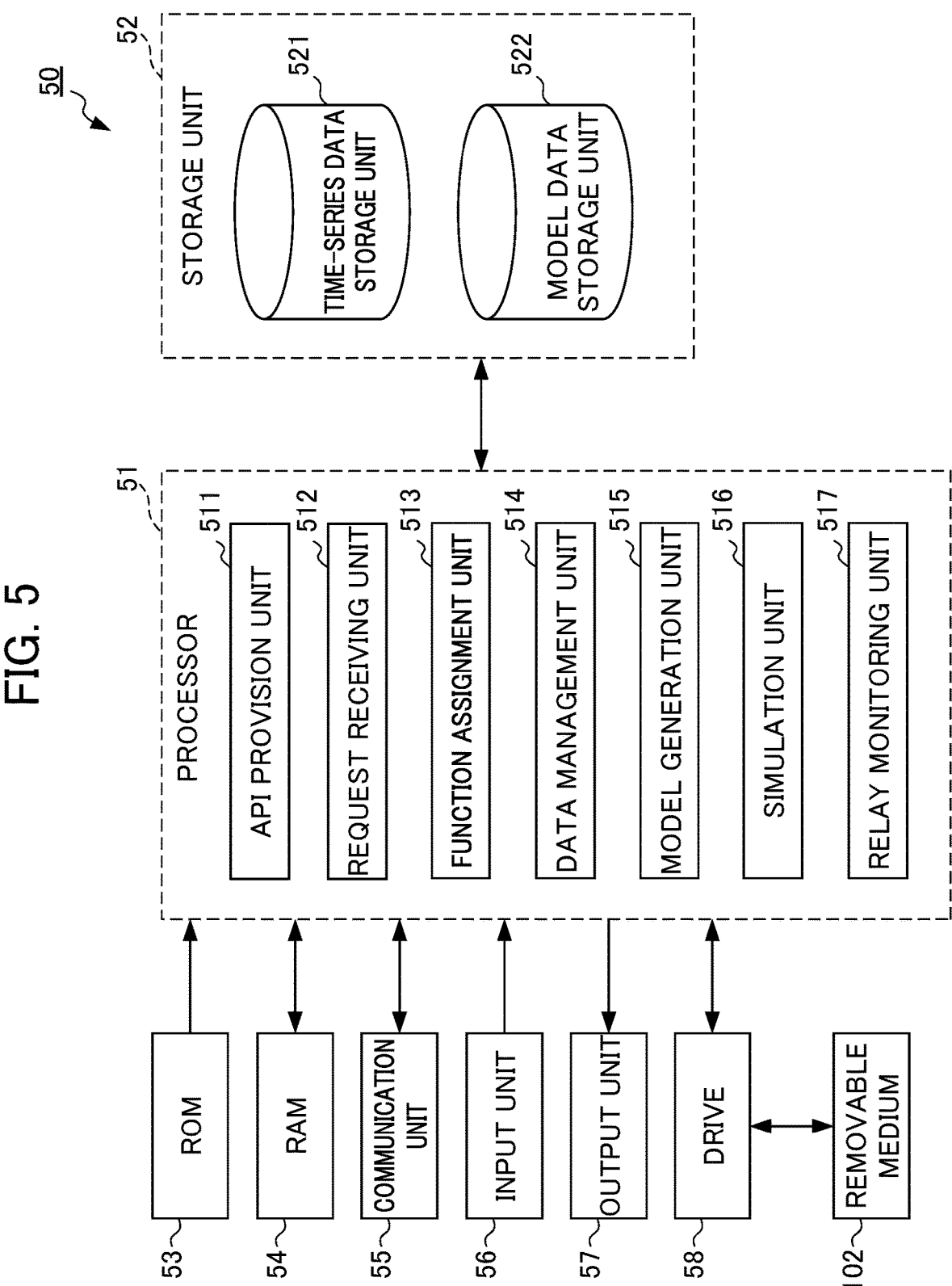
FIG. 5 is a block diagram showing the hardware configuration and the functional configuration of the function management system 50.

FIG. 5 is a block diagram showing the hardware configuration and the functional configuration of the function management system 50.

As shown in FIG. 5, the function management system 50 includes a processor 51, a storage unit 52, a ROM 53, a RAM 54, a communication unit 55, an input unit 56, an output unit 57, and a drive 58. Each of these units is the same as corresponding hardware with the same name included in the client system 40, thus a redundant repeated description is omitted. On the drive 58, a removable medium 102 that is a removable medium similar to the removable medium 101 is mounted as appropriate.

As described above, the function management system 50 having such a hardware configuration performs the "functional management process" by collaborating with the client system 40. When the functional management process is performed, an API provision unit 511, a request receiving unit (also referred to herein as a request receiver) 512, a function assignment unit (also referred to herein as an assigner or assignment unit) 513, a data management unit 514, a model generation unit 515, a simulation unit 516, and a relay monitoring unit 517 function in the processor 51. A time-series data storage unit 521, and a model data storage unit 522 are formed in the data storage unit 52. In also a case not particularly mentioned below, data necessary to implement a process is sent and received between these functional blocks at an appropriate timing as needed. Note that in the functional management process, as described above, the assigned function is dynamically changed depending on for which one of the processes, an execution request has been received. Thus, all of these illustrated functional blocks are not necessarily implemented at the same time.

The API provision unit 511 provides API (Application Programming Interface) to achieve cooperation between the client system 40 and the function management system 50. Each functional block of the client system 40, and each functional block of the function management system 50 are implemented by corresponding application software which is executed by arithmetic processing of the processor 41 and the processor 51. The API provision unit 511 is used as an interface for sending and receiving, for example, predetermined data between pieces of application software implementing these functional blocks.

The request receiving unit 512 receives, from the client system 40, an execution request for one process of a plurality of processes based on the control parameters for transmitting force tactile sensation. Note that the request receiving unit 512 may obtain an execution request not only by receiving it from the client system 40, but also based on the operation instructions of a user to the input unit 56. For example, the request receiving unit 512 may obtain an execution request based on the operation instructions of a user specifying which process is to be executed by which client system 40. The request receiving unit 512 outputs the obtained execution request to the function assignment unit 513.

The function assignment unit 513 performs assignment of a function to execute a process. For this purpose, the function assignment unit 513 identifies the functions required to execute the one process specified in the execution request obtained by the request receiving unit 512. In addition, the function assignment unit 513 assigns each of the identified functions to either the client system 40 or the function management system 50 by which the function is to be implemented. In other words, the function management system 50 determines the system as appropriate that implements the function according to the process to be executed this time. The function assignment unit 513 then sends assignment instructions for the function to be implemented to the determined system (including the function management system 50 itself) that implements the function.

Assignment of the function by the function assignment unit 513 is performed based on, for example, the process content of one process, the available resources of the client system 40, and the available resources of the function management system 50. Here, the resources include, for example, both the resources related to hardware and the resources related to software. The resources related to hardware include, for example, the arithmetic processing capability of the processor 41 and the processor 51, the storage capacities of the ROM 43, the ROM 53, the RAM 44, the RAM 54, the storage unit 42, and the storage unit 52, and the communication velocities of the communication unit 45 and the communication unit 55. The resources related to software include, for example, the pieces of software installed to implement the functional blocks. The available resources refer to currently available resources which are, for example, those entire resources excluding the resources in use according to the current load status.

Alternatively, assignment of the function by the function assignment unit 513 is performed based on, for example, the process content of one process, and whether or not target devices for transmission of force tactile sensation based on the control parameters are connected to the client system 40, the target devices being the control device 30, the first drive device 10, and the second drive device 20. A specific example of a functional configuration implemented based on such function assignment instructions of the function assignment unit 513 will be described below with reference to FIGS. 6 to 10.

The data management unit 514 manages various data in the same manner as the data management unit 412 of the client system 40. For example, the data management unit 514 sends and receives time-series data of the control parameters for transmitting force tactile sensation, and model data to and from the client system 40. In addition, the data management unit 514 stores the time-series data in the time-series data storage unit 521 as necessary. In other words, the time-series data storage unit 521 serves as a storage unit to store time-series data. Similarly, the data management unit 514 stores model data in the model data storage unit 522 as necessary. In other words, the model data storage unit 522 serves as a storage unit to store model data. Whether or not data is stored in these storage units is determined based on the assignment instructions provided by the function assignment unit 513. Note that in the same manner as the data management unit 412 of the client system 40, the data management unit 514 also adds label information which is supplemental information to time-series data as necessary, then sends and stores the time-series data. Thus, the client system 40, the function management system 50, and a user who operates these can perform various processes by referring to the label information.

The model generation unit 515 generates model data such as an operating model and an environmental model. These model data can be generated, for example, from the time-series data stored in the time-series data storage unit 521. The generated model data is then utilized as data for a simulation, and data for analysis of a user.

Specifically, the model generation unit 515 generates, as model data, "operating model data" obtained by digitizing predetermined operations performed by the first drive device 10 and the second drive device 20 under the control of the control device 30 into model data, and "environmental model data" obtained by digitizing an object as an operation target, and mass, viscosity and stiffness in the environment into model data.

The operating model data is generated corresponding to each of operations involving contact with an object, the operations including gripping, movement, processing such as polishing, which are predetermined operations. For example, when operating model data for gripping is generated, the model generation unit 515 obtains, based on the label information, time-series data when gripping is performed as a predetermined operation.

For example, the model generation unit 515 obtains time-series data when gripping is performed on various objects. The model generation unit 515 then analyzes these time-series data, and generates operating model data by extracting the change in the parameters for position (angle) and force which are common in the time-series data, by deleting the change in the parameters for position (angle) and force corresponding to an operation not directly related to gripping (e.g., a transport operation after gripping), or by removing noise components (e.g., removing high-frequency components using a low pass filter, and removing an outlier exceeding a threshold).

Note that when many time-series data are present, time-series data to generate operating model data may be limited to the time-series data of the slave device (here, the second drive device 20), for example, when a predetermined movement involving contact with an object is conducted in response to the operation of an expert that is a user who has operated the master device (here, the first drive device 10). This is because an expert operates a device so that a predetermined movement is appropriately conducted without unnecessary movement, thus operating model data with higher accuracy can be obtained by generating operating model data from the time-series data when a predetermined movement involving contact with an object is conducted in response to the operation of such an expert.

The environmental model data is generated corresponding to each of various objects and various environments when a predetermined operation is performed. The environmental model data is model data including, for example, physical properties, such as mass, stiffness, and viscosity of an object to be touched, which are force tactile sensation when contact with an object is made, and texture which provides sensation of an object surface. Upon generation of such environmental model data, the model generation unit 515 obtains time-series data when a certain operation involving contact with a certain object is performed. The model generation unit 515 then generates environmental model data when contact with the certain object is made in the certain operation, based on the time-series data. In addition, the model generation unit 515 continuously adds label information (e.g., the type of the certain operation and the type of the certain object) of the time-series data serving as a generator of the environmental model data to the generated environmental model data. In this manner, generation of environmental model data from various time-series data is repeated, thus pieces of environmental model data respectively corresponding to various objects and various environments are generated.

Using such environmental model data, sensation (specifically, force tactile sensation including texture which provides sensation of an object surface) of an object surface in an actual space or a virtual space can be presented. In this case, sensation (specifically, force tactile sensation including texture which provides sensation of an object surface) of an object surface in various actual spaces or virtual spaces can be presented by changing (e.g., scaling the values of control parameters for position (angle) and force, and scaling time in environmental model data) existing environmental model data according to an execution request from the client system 40.

When sensation of an object surface is presented in this manner, for example, stiffness, viscosity and inertia (impedances) of an object to be touched are assumed to be inherent, and a reaction force from the object is defined as a function associated with a position on the object surface in a planar direction and a position in a perpendicular direction to the plane to generate environmental model data, thus texture which provides sensation of the object surface is digitized. Specifically, stiffness, viscosity and inertia are defined as constants or values mapped in an actual space or a virtual space, and sensation of an object to be touched is defined based on a motion equation in which the position to determine action and reaction to and from the object is expressed by a function having, as elements, a position on the object surface in a planar direction and a position in a perpendicular direction to the plane.

When a position on the object surface in a planar direction and a position in a perpendicular direction to the plane are given as inputs to an actual space or a virtual space, the value determined by the function defining the sensation of an object to be touched is input as a reference value, and reproduction data transmission control is performed, thereby making it possible to present force tactile sensation including texture which provides sensation of an object surface.

Specifically, when the shape of the object surface to be touched is not a smooth plane, but has microscopic irregularities, it is understood that the impedances (stiffness, viscosity and inertia) of the object itself do not change, and the surface shape (contour) has changed. In this case, it can be said that more appropriate understanding of phenomena is that parameter Z which represents the impedance of the object does not change, and the reaction force from the object has changed depending on the position to be touched (position x on the object surface in a planar direction and position y in a perpendicular direction to the plane).

Thus, the model generation unit 515 defines the sensation of an object by the stiffness, viscosity and inertia specific to the object, and the contour information on the object surface.

Specifically, the sensation of an object is defined by the following Expressions (1) and (2).

[Expression 1]

$$f = m\ddot{x} + d\dot{x} + kx \qquad (1)$$

$$x = g(y, t) \qquad (2)$$

Note that in Expressions (1) and (2), f indicates a reaction force from the object to be touched, m indicates inertia, d indicates viscosity, k indicates stiffness, g indicates a function representing the contour of the object surface, and t indicates time. Since the function representing the contour of the object surface is a function of time t, Expression (2) represents the contour of the object surface whose shape changes in response to contact.

In this case, the parameters to be managed in acquisition or presentation of sensation are the stiffness, viscosity and inertia (impedances) specific to the object, the position on the object surface in a planar direction and the position in a perpendicular direction to the plane, thus the sensation can be acquired or presented by a smaller number of parameters. Note that when the stiffness, viscosity and inertia are understood to change (in other words, the impedances vary according to the contact position) at each of contact positions of the object to be touched, the stiffness, viscosity and inertia of the object to be touched are each understood as a function associated with the position on the touched object surface in a planar direction.

Alternatively, when the impedances Z1 to Z5 are understood to change according to the position x on the touched object surface in a planar direction, the sensation of the object is expressed as in the following Expression (3).

[Expression 2]

$$f = m(x)\ddot{x} + d(x)\dot{x} + k(x)x \qquad (3)$$

In the case of Expression (3), data of stiffness, viscosity and inertia needs to be held for each position, thus the number of parameters to be managed becomes relatively large, as compared to when the sensation of an object is defined as in Expressions (1) and (2), therefore, the implementation cost may increase, and the amount of calculation may increase.

The model generation unit 515 generates environmental model data indicating the sensation of an object by providing the definition in this manner.

In this manner, the model generation unit 515 generates operating model data and environmental model data from the time-series data. Note that the model generation unit 515 continuously adds label information to these generated model data. Generation of these model data may be implemented only by the arithmetic processing of a computer (here, the processor 51), or implemented also based on operation instructions (e.g., selection of time-series data serving as a generator of model data) of a user to the input unit 56.

The simulation unit 516 performs a simulation related to control over transmission of force tactile sensation. Note that the details of the simulation are as described above in the explanation of the browser unit 413 of the client system 40. As described above, the conditions (e.g., selection of model data to be used for a simulation) for performing such a simulation in the function management system 50 and the client system 40 are determined based on the operation instructions of a user to the input unit 56 of the function management system 50, or the input unit 46 of the client system 40, for example.

The simulation unit 516 sends a simulation result to the client system 40 for browsing to a user, the simulation result being based on the conditions corresponding to the operation instructions of the user. As in the browsing in the client system 40, a simulation result may be browsed also in the function management system 50 by displaying the simulation result on a display included in the output unit 57

Consequently, even when the control device 30 and others are not connected to the client system 40, an operation result can be identified without an actual operation of a user.

The relay monitoring unit 517 relays the control parameters for transmitting force tactile sensation to be sent and received between the remote operating units 415 of a plurality of client systems 40.

As described above, the remote operating unit 415 of each client system 40 sends and receives the control parameters for transmitting force tactile sensation to and from each other, thereby executing control over transmission of force tactile sensation bi-directionally between the actuator 12 of the first drive device 10 serving as the master device, and the actuator 22 of the second drive device 20 serving as the slave device.

The relay monitoring unit 517 relays the control parameters for transmitting force tactile sensation to be sent and received. Thus, the relayed control parameters can be presented to a user. A user refers to the presented contents, thus can monitor, for example, whether force tactile sensation is appropriately transmitted, and an operation is normally performed. This presentation can be achieved by displaying the control parameters on a display included in the output unit 57. In this case, for example, as in the browsing in the client system 40, the operations of the first drive device 10 serving as the master device and the second drive device 20 serving as the slave device, which are reproduced from the control parameters, may be represented by patterned computer graphics, or displayed as a graph. For example, when an abnormal value or the like is detected in the control parameters, alert display may be performed, or alert sound may be output.

Consequently, a user can easily monitor the operations of the first drive device 10 and the second drive device 20 which work remotely.

In this case, the relay monitoring unit 517 may relay the control parameters, and perform transformation necessary for transmission of force tactile sensation onto the control parameters. For example, the attributes (e.g., the range of movement, the torque output range and the sampling cycle) of the first drive device 10 serving as the master device may be different from the attributes (e.g., the range of movement, the torque output range and the sampling cycle) of the second drive device 20 serving as the slave device. In this case, simply relaying the control parameters does not lead to appropriate transmission of force tactile sensation, and bilateral control cannot be performed. Thus, in this situation, the relay monitoring unit 517 considers the difference in respective attributes, and performs transformation processes, such as coordinate transformation of the control parameters, scaling of the values of the control parameters, scaling of time, and interpolation and thinning of the control parameters. Alternatively, in this situation, the relay monitoring unit 517 considers the difference in respective attributes, and performs normalization and non-normalization processes. In this case, a control parameter sent from one device is normalized based on the attributes of the device as a transmission source, the normalized control parameter is non-normalized based on the attributes of another device as a transmission destination, then is sent to another device.

Performing such a transformation bi-directionally allows the difference in the attributes of the devices to be eliminated, and the control parameters can be relayed, and bilateral control to transmit force tactile sensation appropriately can be implemented.

As a technique of generating normalization or non-normalization, existing techniques related to generation of normalization or non-normalization, such as min-max scale transformation, variance scale transformation, and scale transformation using a quantile, can be used. Note that the technique to be used may vary for each control parameter, for example, when the value of the position (angle) of a control parameter is normalized or non-normalized, a first technique is used, and when the value of the force of a control parameter is normalized or non-normalized, a second technique is used. In this case, as a minimum value and a maximum value used for normalization and non-normalization, for example, a minimum value and a maximum value of a control parameter value in time-series data, and a minimum value and a maximum value corresponding to the attributes (e.g., the range of movement, the torque output range and the sampling cycle) of each device can be used.

Each device included in the information processing system S and the functional configuration of the system have been described in detail above. Next, a specific example of a functional configuration implemented based on the function assignment instructions of the function assignment unit 513 will be described with reference to FIGS. 6 to 10.

As described above, assignment of a function by the function assignment unit 513 is performed based on, for example, the process content of one process for which an execution request has been received, the available resources of the client system 40, and the available resources of the function management system 50. Alternatively, assignment of a function by the function assignment unit 513 is performed based on, for example, the process content of one process for which an execution request has been received, and whether or not target devices for transmission of force tactile sensation based on the control parameters are connected to the client system 40, the target devices being the control device 30, the first drive device 10, and the second drive device 20.

[First Functional Configuration]

Figure 6:
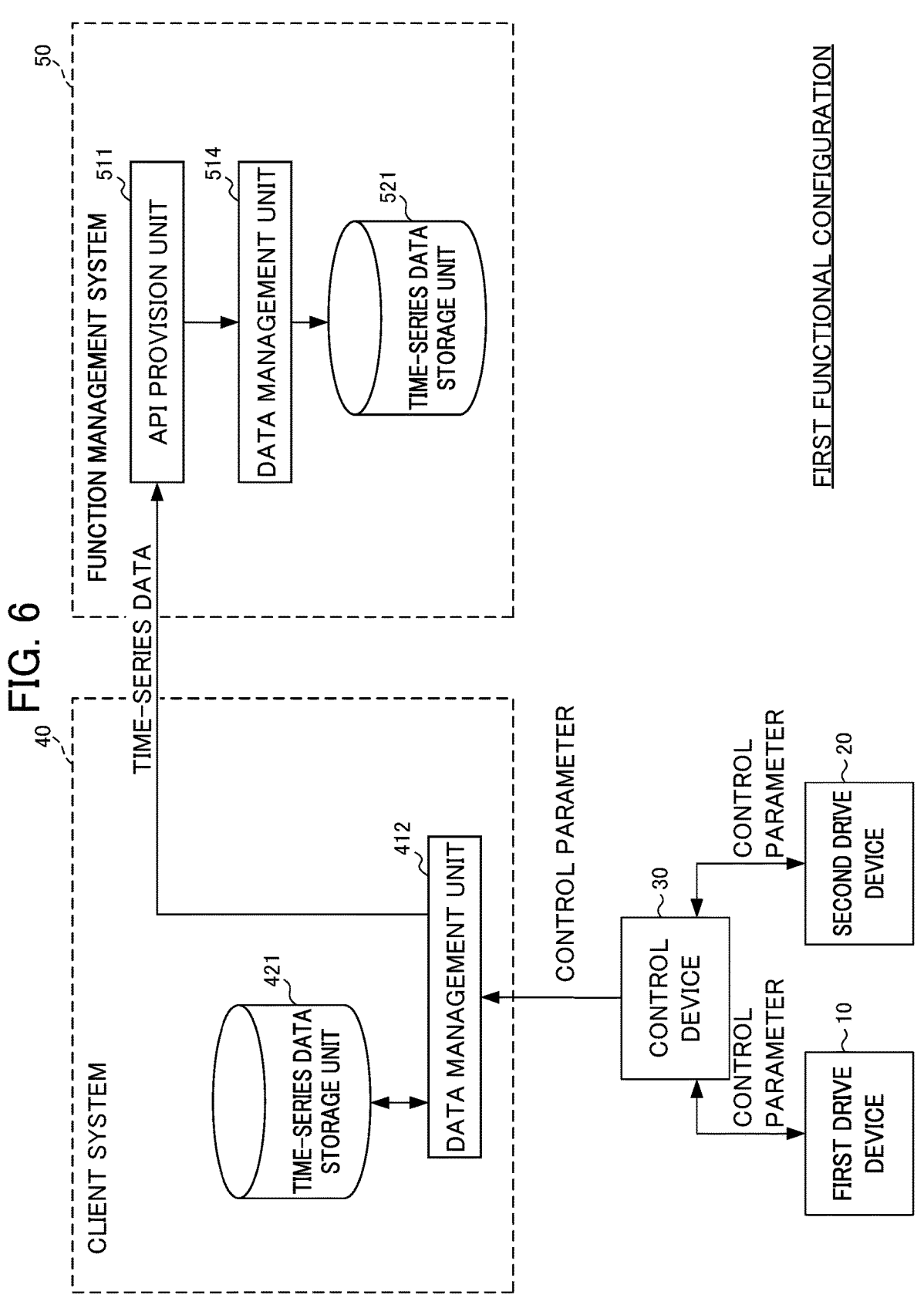
FIG. 6 is a block diagram showing a first functional configuration that is one of specific examples of functional configuration.

FIG. 6 is a block diagram showing a first functional configuration that is one of specific examples of functional configuration implemented based on the function assignment instructions of the function assignment unit 513. In FIG. 6, the main functional block implemented in the first functional configuration is shown.

In the first functional configuration, when the process content of one process for which an execution request has been received includes a process of storing time-series data of a control parameter, the functional configuration is implemented based on the function assignment instructions of the function assignment unit 513. In this case, the function assignment unit 513 performs assignment instructions so that the functions required to execute the process of storing time-series data of a control parameter are implemented by the function management system 50.

The specific functional configuration and the flow of data sent and received between devices in this case will be described. First, the actual operation transmission control is performed based on the control of the control device 30, both the master device (here, the first drive device 10) and the slave device (here, the second drive device 20) are actually driven, and force tactile sensation accompanying the actual drive is transmitted.

Then, the control device 30 sends the control parameters for transmitting force tactile sensation to the data management unit 412 of the client system 40 in time series. The data management unit 412 temporarily stores the control parameters sent in time series into the time-series data storage unit 421.

When the actual operation transmission control is completed (in other words, when the operation based on the control of the control device 30 is completed), the data management unit 412 adds label information to the time-series data of the control parameters temporarily stored in the time-series data storage unit 421, then sends the time-series data to the function management system 50. Note that the timing to send the time-series data is not limited to this. For example, even if the actual operation transmission control is on-going (in other words, the operation based on the control of the control device 30 is on-going), the data management unit 412 may send the time-series data at a timing based on a predetermined cycle, or a predetermined condition (e.g., the data volume of the temporarily stored time-series data exceeds a predetermined volume).

After the transmission, the data management unit 412 which has sent the time-series data in this manner deletes the control parameters temporarily stored in the time-series data storage unit 421.

The data management unit 514 of the function management system 50 receives, via the API provision unit 511, the time-series data with added label information, and stores the time-series data in the time-series data storage unit 521.

According to the first functional configuration above, the actual operation transmission control is performed by the control device 30 that performs control over transmission of force tactile sensation stably at a high speed by the dedicated integrated circuit 32. In addition, direct communication with the control device 30 makes it possible to obtain control parameters in real time without causing a loss in the control parameters by the client system 40 capable of performing stable and high-speed communication. It is not necessary to continue to store the control parameters in the client system 40, thus the storage capacity of the client system 40 does not need to be increased more than necessary. Furthermore, in the function management system 50, collecting time-series data from each client system 40 eliminates the need for real-time communication with each control device 30, thus a database of various time-series data can be constructed. In relation to this, it is also easy to increase the storage capacity of the function management system 50 as appropriate by utilizing a cloud system or adding a large storage.

In this manner, the function assignment unit 513 dynamically implements an appropriate functional configuration based on the process content of one process for which an execution request has been received, the available resources (here, stable communication with the control device 30) of the client system 40, and the available resources (here, it is easy to increase the storage capacity) of the function management system 50. In addition, the function assignment unit 513 dynamically implements an appropriate functional configuration based on the process content of one process for which an execution request has been received, and connection of the client system 40 with target devices for transmission of force tactile sensation based on the control parameters, the target devices being the control device 30, the first drive device 10, and the second drive device 20.

[Second Functional Configuration]

FIG. 7 is a block diagram showing a second functional configuration that is one of specific examples of functional configuration implemented based on the function assignment instructions of the function assignment unit 513. In FIG. 7, the main functional block implemented in the second functional configuration is shown.

In the second functional configuration, when the process content of one process for which an execution request has been received includes a process of generating new data based on a control parameter, the functional configuration is implemented based on the function assignment instructions of the function assignment unit 513. In this case, the function assignment unit 513 performs assignment instructions so that the functions required to execute the process of generating new data based on the control parameter are implemented by the function management system 50.

The specific functional configuration and the flow of data sent and received between devices in this case will be described. First, the model generation unit 515 generates new data such as operating model data and environmental model data based on the time-series data stored in the time-series data storage unit 521. The model generation unit 515 stores each generated model data in the model data storage unit 522.

The model generation unit 515 receives a simulation condition from the browser unit 413 of the client system 40 via the simulation unit 516. The model generation unit 515 selects time-series data used for a simulation, operating model data or environmental model data based on the simulation condition, and executes a simulation based on the selected data, thereby generating new data which is a simulation result.

The model generation unit 515 then sends the simulation result to the browser unit 413 of the client system 40 via the simulation unit 516.

The browser unit 413 allows a user to browse the received simulation result.

According to the second functional configuration above, generation of new data, such as generation of each model data requiring high arithmetic processing capability, and generation of a simulation result, is performed by the function management system 50 capable of improving an arithmetic process as appropriate by utilizing a cloud system or performing parallel processing in a plurality of servers. In relation to this, a simulation does not necessarily have to be performed in real time, thus a simulation can be performed as appropriate by the function management system 50 at a timing in which the usage status of the processor 51 and the RAM 54 is taken into consideration. In contrast, to allow a user of the client system 40 to browse the simulation result, the output unit 47 of the client system 40 is necessary, thus browsing itself is performed by the client system 40.

In this manner, the function assignment unit 513 dynamically implements an appropriate functional configuration based on the process content of one process for which an execution request has been received, the available resources (here, the browsing function for a user) of the client system 40, and the available resources (here, it is easy to improve an arithmetic process and adjust a timing to execute a simulation) of the function management system 50. In addition, the function assignment unit 513 dynamically implements an appropriate functional configuration based on the process content of one process for which an execution request has been received, and non-necessity of connection of the client system 40 with target devices for transmission of force tactile sensation based on the control parameters, the target devices being the control device 30, the first drive device 10, and the second drive device 20.

[Third Functional Configuration]

Figure 8:
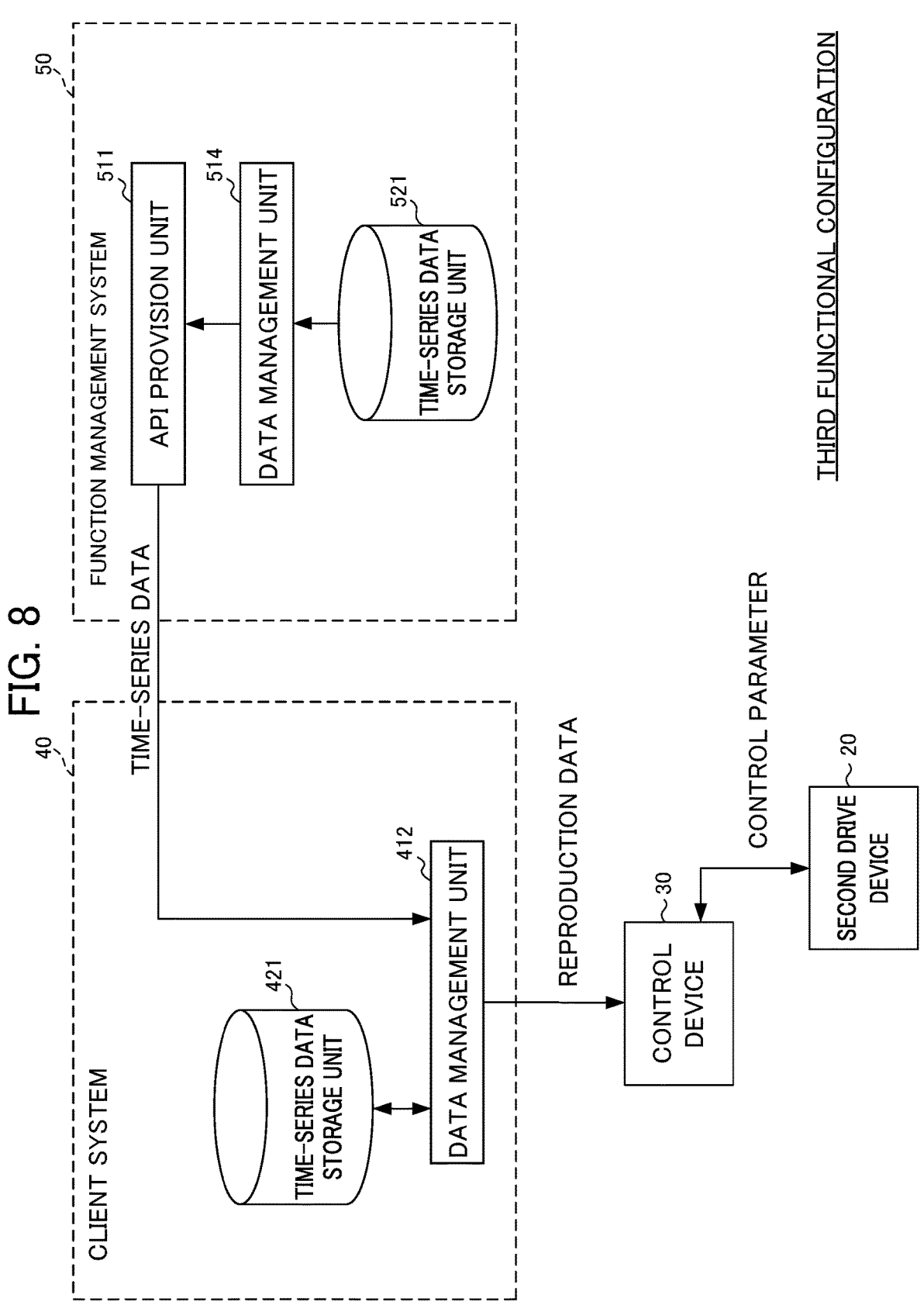
FIG. 8 is a block diagram showing a third functional configuration that is one of specific examples of functional configuration.

FIG. 8 is a block diagram showing a third functional configuration that is one of specific examples of functional configuration implemented based on the function assignment instructions of the function assignment unit 513. In FIG. 8, the main functional block implemented in the third functional configuration is shown.

In the third functional configuration, when the process content of one process for which an execution request has been received includes a process of sending and receiving a control parameter to and from the control device 30 that transmits force tactile sensation with the slave device (here, the second drive device 20) as a target, the functional configuration is implemented based on the function assignment instructions of the function assignment unit 513. In this case, the function assignment unit 513 performs assignment instructions so that the functions required to execute a process of sending and receiving a control parameter to and from the control device 30 are implemented by the client system 40.

The specific functional configuration and the flow of data sent and received between devices in this case will be described. First, the data management unit 514 obtains time-series data (e.g., time-series data corresponding to the attributes of a device connected to the client system 40 as a transmission source of the execution request, and the time-series data specified in the execution request) corresponding to the execution request received this time from the time-series data stored in the time-series data storage unit 521.

The data management unit 514 sends the obtained time-series data to the browser unit 413 of the client system 40 via the API provision unit 511.

The data management unit 412 receives the time-series data, and stores it in the time-series data storage unit 421.

The data management unit 412 sends the stored time-series data to the control device 30 as the reproduction data.

The control device 30 performs the reproduction data transmission control based on the reproduction data.

According to the third functional configuration above, the reproduction data transmission control is performed by the control device 30 that performs control over transmission of force tactile sensation stably at a high speed by the dedicated integrated circuit 32. In addition, direct communication with the control device 30 makes it possible to send reproduction data to the control device 30 in real time without causing a loss in the control parameters by the client system 40 capable of performing stable and high-speed communication. In contrast, appropriate time-series data is obtained by the function management system 50 which has stored various time-series data as a database.

In this manner, the function assignment unit 513 dynamically implements an appropriate functional configuration based on the process content of one process for which an execution request has been received, the available resources (here, stable velocity through the control device 30) of the client system 40, and the available resources (here, various time-series data are stored as a database) of the function management system 50. In addition, the function assignment unit 513 dynamically implements an appropriate functional configuration based on the process content of one process for which an execution request has been received, and connection of the client system 40 with target devices for transmission of force tactile sensation based on the control parameters, the target devices being the control device 30, and the second drive device 20.

Note that the third functional configuration may be applied to a process of performing the reproduction data transmission control not based on the time-series data stored in the time-series data storage unit 521, but based on the operation model stored in the model data storage unit 522.

[Fourth Functional Configuration]

Figure 9:
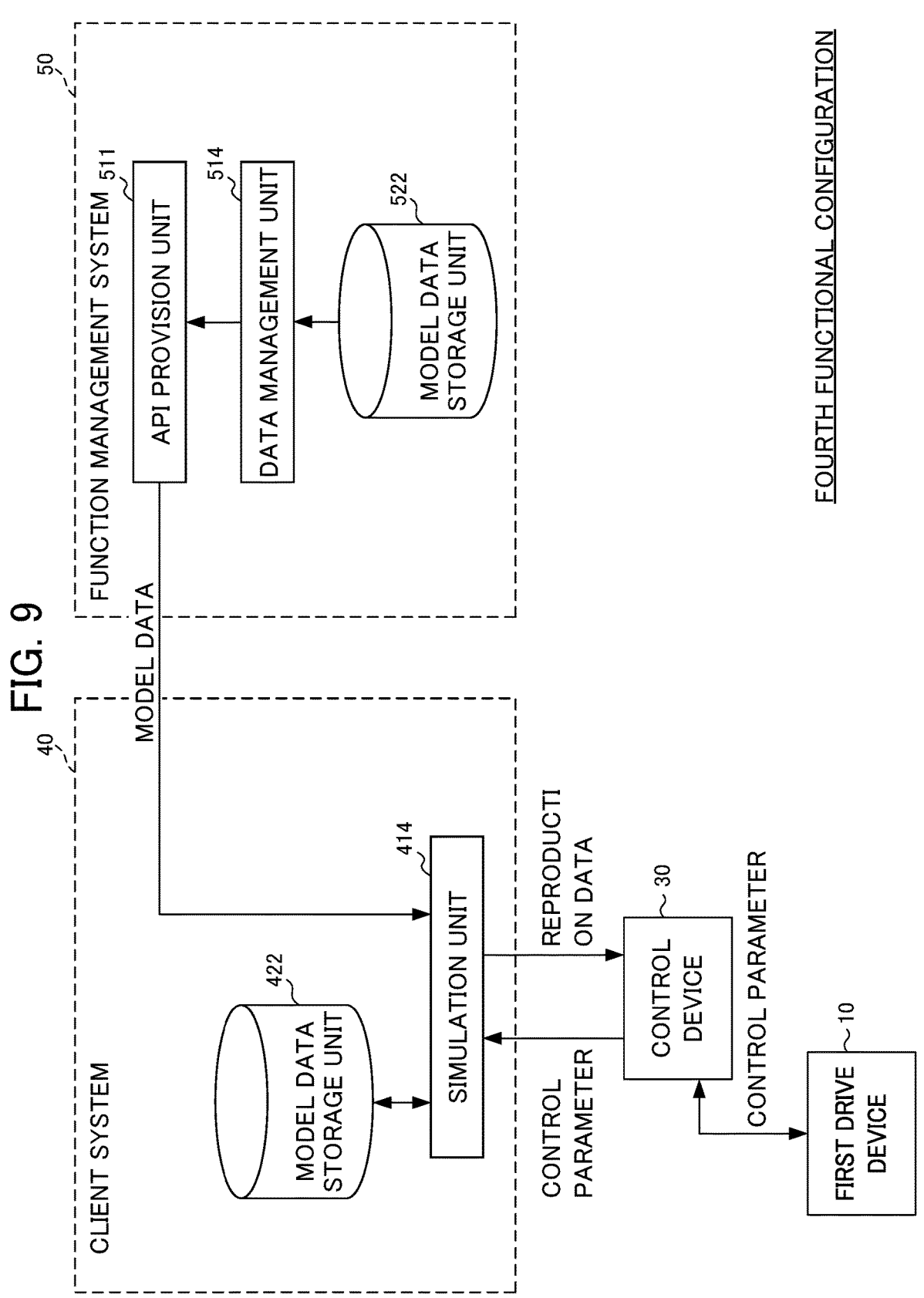
FIG. 9 is a block diagram showing a fourth functional configuration that is one of specific examples of functional configuration.

FIG. 9 is a block diagram showing a fourth functional configuration that is one of specific examples of functional configuration implemented based on the function assignment instructions of the function assignment unit 513. In FIG. 9, the main functional block implemented in the fourth functional configuration is shown.

In the fourth functional configuration, when the process content of one process for which an execution request has been received includes a process of sending and receiving a control parameter to and from the control device 30 that transmits force tactile sensation with the master device (here, the first drive device 10) as a target, the functional configuration is implemented based on the function assignment instructions of the function assignment unit 513. In this case, the function assignment unit 513 performs assignment instructions so that the functions required to execute a process of sending and receiving a control parameter to and from the control device 30 are implemented by the client system 40.

The specific functional configuration and the flow of data sent and received between devices in this case will be described. First, the data management unit 514 obtains environmental model data (e.g., environmental model data corresponding to a virtual object to be touched of a device connected to the client system 40 as a transmission source of the execution request, and the environmental model data specified in the execution request) corresponding to the execution request received this time from the time-series data stored in the model data storage unit 522. The data management unit 514 sends the obtained environmental model data to the simulation unit 414 of the client system 40 via the API provision unit 511.

The simulation unit 414 receives the environmental model data, and stores it in the model data storage unit 422. The simulation unit 414 performs a simulation by assuming that the position (specifically, the position or the angle) of a movement object moved by the actuator 12 corresponds to the master device in a virtual space, the position being obtained from the stored environmental model data, and the control device 30 and detected by the position sensor 13 of the master device (here, the first drive device 10) actually driven. The simulation unit 414 then sends the control parameters in the simulation result to the control device 30 as the reproduction data.

The control device 30 performs the reproduction data transmission control based on the reproduction data.

Such simulation in the simulation unit 414, and reflection of the control parameters of the master device (here, the first drive device 10) actually driven to the simulation are repeated in real time, thereby making it possible to implement compliance control corresponding to the environmental model data.

According to the fourth functional configuration above, the reproduction data transmission control is performed by the control device 30 that performs control over transmission of force tactile sensation stably at a high speed by the dedicated integrated circuit 32. In addition, direct communication with the control device 30 makes it possible to send reproduction data and receive control parameters to and from the control device 30 in real time without causing a loss in the control parameters by the client system 40 capable of performing stable and high-speed communication. All the simulations corresponding to the environmental model do not need to be executed by the client system 40, and part of the simulations is distributed and executed by the control device 30 including the dedicated integrated circuit 32. In contrast, appropriate environmental model data is obtained by the function management system 50 which has stored various environmental model data.

In this manner, the function assignment unit 513 dynamically implements an appropriate functional configuration based on the process content of one process for which an execution request has been received, the available resources (here, stable communication with the control device 30) of the client system 40, and the available resources (here, various environmental model data are stored as a database) of the function management system 50. In addition, the function assignment unit 513 dynamically implements an appropriate functional configuration based on the process content of one process for which an execution request has been received, and connection of the client system 40 with target devices for transmission of force tactile sensation based on the control parameters, the target devices being the control device 30 and the first drive device 10.

[Fifth Functional Configuration]

FIG. 10 is a block diagram showing a fifth functional configuration that is one of specific examples of functional configuration implemented based on the function assignment instructions of the function assignment unit 513. In FIG. 10, the main functional block implemented in the fifth functional configuration is shown.

In the fifth functional configuration, when the process content of one process for which an execution request has been received includes a process of relaying the control parameters for transmitting force tactile sensation to be sent and received between a plurality of client systems 40 while performing necessary transformation, and a process of presenting the relayed control parameters to a user, the functional configuration is implemented based on the function assignment instructions of the function assignment unit 513. In this case, the function assignment unit 513 performs assignment instructions so that the functions required to execute a process of sending and receiving a control parameter to and from the control device 30 are implemented by the function management system 50.

The specific functional configuration and the flow of data sent and received between devices in this case will be described. First, the actual operation transmission control is performed based on the control of each control device 30 (here, control device 30-1 and control device 30-2), both the master device (here, the first drive device 10-1) and the slave device (here, the second drive device 20-2) are actually driven, and force tactile sensation accompanying the actual drive is transmitted. Then each control device 30 sends the control parameters for transmitting force tactile sensation to the remote operating unit 415 of each of the client systems 40 (here, client system 40-1 and client system 40-2) connected to itself in time series. These remote operating units 415 send and receive the control parameters for transmitting force tactile sensation to and from each other via the API provision unit 511 and the network N, thereby performing control over transmission of force tactile sensation bi-directionally between the actuator 12 of the first drive device 10 serving as the master device and the actuator 22 of the second drive device 20 serving as the slave device. The relay monitoring unit 517 relays the control parameters for transmitting force tactile sensation to be sent and received, while performing necessary transformation (e.g., normalization and non-normalization, and scaling), and presents the relayed control parameters to a user.

According to the fifth functional configuration above, the actual operation transmission control is performed by the control device 30 that performs control involving transmission of force tactile sensation stably at a high speed by the dedicated integrated circuit 32. In addition, direct communication with the control device 30 makes it possible to send and receive the control parameters in real time without causing a loss in the control parameters by the client system 40 capable of performing stable and high-speed communication. Since transformation of the sent and received control parameters is performed by the function management system 50, each client system 40 does not need to perform transformation in consideration of the difference in respective attributes of the master device (here, the first drive device 10-1), and the slave device (here, the second drive device 20-2) in a transmission-destination client system 40.

In this manner, the function assignment unit 513 dynamically implements an appropriate functional configuration based on the process content of one process for which an execution request has been received, the available resources (here, stable communication with the control device 30) of the client system 40, and the available resources (here, bi-directional transformation is performed by arithmetic processing) of the function management system 50. In addition, the function assignment unit 513 dynamically implements an appropriate functional configuration based on the process content of one process for which an execution request has been received, and connection of the client system 40 with target devices for transmission of force tactile sensation based on the control parameters, the target devices being the control device 30, the first drive device 10 or the second drive device 20.

Multiple specific examples of the functional configuration implemented based on the function assignment instructions of the function assignment unit 513 have been described above. However, these are only for illustrative purposes, and not intended to limit the functional configuration implemented. The function assignment unit 513 can dynamically implement various functional configurations based on the available resources of the systems, and the connection status of the control device 30 and others. For example, when one processor (here, one of the processor 41 or the processor 51) is in a high load state, and the available resources (here, the arithmetic processing capability) are insufficient, the function assignment unit 513 may allow the other processor (here, the other of the processor 41 or the processor 51) to implement the function in a functional configuration different from the above-described functional configurations.

Besides, although each functional configuration has been individually explained in the above description, the function management system 50 may implement a plurality of functional configurations concurrently for a plurality of client systems 40 as a target. For example, the first functional configuration may be implemented between the function management system 50 and each of a first client system 40 and a second client system 40 concurrently. Alternatively, the first functional configuration may be implemented between the function management system 50 and the first client system 40, whereas the second functional configuration may be implemented between the function management system 50 and the second client system 40 concurrently. In this manner, a plurality of functions can be implemented at the same time in a plurality of client systems 40 by implementing a plurality of functional configurations concurrently.

Besides, although each functional configuration has been individually explained in the above description, the function management system 50 can implement functional configurations concurrently for one client system 40 as a target. For example, the fourth functional configuration and the first functional configuration are implemented concurrently. In this case, as described above, the fourth functional configuration implements compliance control corresponding to environmental model data under a predetermined condition by a simulation, and the first functional configuration obtains time-series data of the control parameters calculated in the compliance control. The time-series data obtained by the first functional configuration is then stored in the time-series data storage unit 521 of the function management system 50. In this manner, a plurality of functions can be implemented in one client system 40 at the same time by implementing a plurality of functional configurations concurrently.

[Functional Management Process]

FIG. 11 is a flowchart illustrating the flow of a functional management process executed by the information processing system S. As described above, the functional management process is a series of processes that assign each of functions required to execute one process for which an execution request has been received to either the client system 40 or the function management system 50 by which the function is to be implemented, and the one process is executed by the assigned function. The functional management process is executed upon receiving start instructions operation of a user to the input unit 46 of the client system 40 for an execution request functional management process.

First, the process content of the client system 40 will be described.

In step S11, the process request unit 411 receives an execution request by an instruction operation of a user to the input unit 46, the execution request being for one process of a plurality of processes based on the control parameters for transmitting force tactile sensation.

In step S12, the process request unit 411 sends the received execution request to the function management system 50.

In step S13, the process request unit 411 receives assignment instructions from the function management system 50 as a response to the sent execution request.

In step S14, the functional block which should implement a function implements the function according to the received assignment instructions. Which functional block implements the function is determined as in the above-described functional configuration with reference to FIGS. 6 to 10, for example.

In step S15, each functional block which has implemented the function executes a process corresponding to the execution request by the implemented function.

In step S16, each functional block which has implemented the function determines whether or not the process corresponding to the execution request is completed. When the process corresponding to the execution request is completed, determination of Yes is made in step S16, and the functional management process proceeds to step S17. In contrast, when the process corresponding to the execution request is not completed, determination of No is made in step S16, and the functional management process is returned to step S15 and repeated.

In step S17, each functional block which has implemented the function ends the implementation of the function. This completes the present functional management process of the client system 40.

Next, the process content of the function management system 50 will be described.

In step S21, the request receiving unit 512 receives an execution request sent from the client system 40.

In step S22, the function assignment unit 513 identifies the functions required to execute a process corresponding to the received execution request.

In step S23, the function assignment unit 513 assigns each of the identified functions to either the client system 40 or the function management system 50 by which the function is to be implemented.

In step S24, the function assignment unit 513 sends assignment instructions for the function to be implemented to each system (including the function management system 50 itself) that implements the function.

In step S25, the functional block which should implement the function implements the function according to the assignment instructions. Which functional block implements the function is determined as in the above-described functional configuration with reference to FIGS. 6 to 10, for example.

In step S26, each functional block which has implemented the function executes a process corresponding to the execution request by the implemented function.

In step S27, each functional block which has implemented the function determines whether or not the process corresponding to the execution request is completed. When the process corresponding to the execution request is completed, determination of Yes is made in step S27, and the functional management process proceeds to step S28. In contrast, when the process corresponding to the execution request is not completed, determination of No is made in step S27, and the functional management process is returned to step S26 and repeated.

In step S26, each functional block which has implemented the function ends the implementation of the function. This completes the present functional management process of the function management system 50.

According to the functional management process described above, the system that implements a function is determined as appropriate according to the process to be executed every time. Therefore, according to the functional management process, when a process related to force tactile sensation is performed, a problem of dynamically assigning a function to execute the process more appropriately can be solved.

Modifications

Although the embodiment of the present invention has been described above, the embodiment is only for illustrative purposes, and does not limit the technical scope of the present invention. The present invention may include various other embodiments in a range not departing from the gist of the present invention, and various modifications such as omission and replacement may be made.

In the above-described embodiment, it is assumed that one function management system 50 is present. The one function management system 50 implements one or more functional configurations between itself and each client system 40 at the same time. In addition, without being limited to this, a plurality of function management systems 50 may be present. The plurality of function management systems 50 may coordinate with each other.

In this case, for example, the actual operation transmission control is performed by implementing the fifth functional configuration in the first function management system 50. When the second function management system 50 implements the first functional configuration, the first function management system 50 behaves as the client system 40 in the first functional configuration. Thus, it is possible to store the time-series data in the actual operation transmission control in the second management system 50.

Besides, load distribution is performed in the plurality of function management systems 50. For example, suppose that the first function management system 50 which has received an execution request from a client system 40 is in a high load state, and available resources are insufficient. In this case, the first function management system 50 transfers the functional management process for the execution request to the second function management system 50 that is in a low load state and has sufficient available resources. Upon receiving this, the second function management system 50 assigns the execution request to either the client system 40 as a transmission source of the execution request or the second function management system 50 itself by which the execution request is to be implemented. Thus, the process in the first function management system 50 in a high load state can be transferred to the second function management system 50, thereby making it possible to implement load distribution.

Besides, the control device 30 and the client system 40 are implemented as different devices. Without being limited to this, for example, the control device 30 and the client system 40 may be implemented as an integrated device.

Besides, for example, a set may be present which includes one control device 30, a plurality of first drive devices 10 and a plurality of second drive devices 20. In such a set, for example, a plurality of first drive devices 10 operate as the master device for a multi-degree of freedom robot arm, and a plurality of second drive devices 20 operate as the slave device for a multi-degree of freedom robot arm, and all these operations are controlled by one control device 30. Besides, for example, the control device 30 may be implemented as a device integrated with the first drive device 10 or the second drive device 20. Besides, for example, the function management system 50 may be implemented by a plurality of server devices that form a cloud server. In other words, the system configuration in the above-described embodiment is only an example, and can be altered to various configurations as appropriate.

As described above, the function management system 50 according to the present embodiment is communicatively connected to the client system 40, and includes the request receiving unit 512, and the function assignment unit 513.

The request receiving unit 512 receives an execution request for one process of a plurality of processes based on the control parameters for transmitting force tactile sensation.

The function assignment unit 513 identifies the functions required to execute the one process, and assigns each of the identified functions to either the client system 40 or the function management system 50 by which the function is to be implemented.

The function management system 50 manages to determine which of the function management system 50 itself or the client system 40 implements various functions required to execute various processes. Herein, the function management system 50 is not only assumed to perform a specific process as a general technique does. The function management system 50 has diverse processes related to force tactile sensation, and it is assumed that a specific functional configuration is not necessarily optimal for all of these processes.

Under this assumption, as described above, the function management system 50 determines the system as appropriate that implements the function according to the process to be executed this time.

Therefore, the function management system 50 makes it possible to solve the problem that when a process related to force tactile sensation is performed, a function is dynamically assigned so that the process can be executed more appropriately.

The function assignment unit 513 performs assignment based on the process content of one process, the available resources of the client system 40, and the available resources of the function management system 50.

Thus, functions according to process content can be dynamically assigned based on the conditions such as the process content (e.g., what type of process is included) of one process, and the available resources (e.g., hardware resources and software resources) of the client system 40 and the function management system 50. For example, appropriate assignment in consideration of distribution of the available resources to the systems can be performed.

The function assignment unit 513 performs assignment based on the process content of one process and whether or not a target device for transmission of force tactile sensation based on the control parameters is connected to the client system 40.

Thus, functions according to process content can be dynamically assigned based on the conditions such as the process content (e.g., what type of process is included) of one process, and whether or not a target device (here, the first drive device 10 and the second drive device 20) for transmission of force tactile sensation based on the control parameters is connected to the client system 40. For example, it is possible to perform appropriate assignment in consideration of whether the process involves the operation of both the master device and the slave device, the process involves the operation of one of the master device and the slave device, or the process involves the operation of none of the master device and the slave device.

When the process content of one process includes a process of storing a control parameter, the function assignment unit 513 performs assignment so that the functions required to execute a process of storing the control parameter are implemented by the function management system 50.

Thus, it is possible to collect, in the function management system 50, time-series data of the control parameters corresponding to various operations in the first drive device 10 and the second drive device 20 in each set. Thus, comparison and analysis of these time-series data are easily performed in the function management system 50. It is not necessary to store these time-series data in the client system 40 in each set, thus the storage capacity of the client system 40 can be reduced.

When the process content of one process includes a process of generating new data based on the control parameters, the function assignment unit 513 performs assignment so that the function management system 50 implements the function required to execute the process of generating new data.

Consequently, time-series data of the control parameters is analyzed, and a process requiring high arithmetic processing capability and/or a large memory capacity, such as a process of generating new time-series data, a process of generating data such as an environmental model and an operating model, and a process of generating data for a simulation, is executed by the function management system 50 so that the load of the client system 40 can be reduced.

When the control device 30 is present which transmits force tactile sensation for at least one of the master device and the slave device as a target based on the control parameters, and the process content of one process includes a process of sending and receiving a control parameter to and from the control device 30, the function assignment unit 513 assigns the function required to execute the process of sending and receiving the control parameter to and from the control device 30 to the client system 40 by which the function is to be implemented.

Thus, the client system 40 communicates with the control device 30 in real time that performs control, and it is possible to utilize the control device 30 to transmit force tactile sensation for at least one of the master device and the slave device (here, the first drive device 10 and the second drive device 20) as a target. In this case, it is possible to eliminate the need for the function management system 50 to perform a process of sending and receiving a control parameter to and from the control device 30 in real time.

When the process content of the one process includes a process of relaying the control parameters sent and received between the first client system 40 and the second client system 40 while performing necessary transformation on the control parameters, and a process of presenting the relayed control parameters to a user, the function assignment unit 513 performs assignment so that the function management system 50 implements the function required to execute the process of relaying the control parameters while performing necessary transformation, and the function required to execute the process of presenting the relayed control parameters to a user.

Thus, when transformation of the control parameters is necessary, the load of the first client system 40 and the second client system 40 can be reduced by the function management system 50 performing the transformation. In addition, presenting the relayed control parameters to a user by the function management system 50 makes it possible to implement monitoring of the control parameters by the user. In other words, the control parameters sent and received to perform relaying involving transformation can also be used as they are for the purpose of monitoring.

When the actuator 12, the position sensor 13, the actuator 22, the position sensor 23, and the force tactile sensation controller 321 are present, the actuator 12 moves a first movement target upon execution of a predetermined action.

The position sensor 13 obtains first position information on the position of the first movement target moved by the actuator 12.

The actuator 22 moves a second movement target upon execution of a predetermined action.

The position sensor 23 obtains second position information on the position of the second movement target moved by the actuator 22.

The force tactile sensation controller 321 controls the actuator 12 so as to output the position and force corresponding to the operation indicated by the second position information based on the first position information, and the second position information which serves as a reference for the operation of the actuator 12 as well as controls the actuator 22 so as to output the position and force corresponding to the operation indicated by the first position information based on the second position information, and the first position information which serves as a reference for the operation of the actuator 22.

The data management unit 514 obtains, as time-series data, at least part of the parameters used by the force tactile sensation controller 321 for the control of the actuator 12 and the actuator 22.

The control parameters for transmitting force tactile sensation are at least part of the parameters used by the force tactile sensation controller 321 for the control of the actuator 12 and the actuator 22.

Consequently, with a simple configuration to detect a position by the position sensor, it is possible to provide the control energy for position (angle) and the control energy for force independently, in other words, to control position (angle) and force independently.

[Function Fulfilled by Hardware or Software]

The functions for performing the series of processes according to the embodiment described above can be fulfilled by using hardware, can be fulfilled by using software, or can be fulfilled by using a combination thereof. In other words, an aspect to fulfill the functions is not particularly limited provided that the functions for performing the series of processes described above are fulfilled by the information processing system S.

For example, in the case where the functions for performing the series of processes described above are fulfilled by a processor that performs an arithmetic operation, examples of the processor that performs the arithmetic operation include processing apparatus such as a single processor, multiple processors, or a multi-core processor, and a combination of the processing apparatus and a processing circuit such as an ASIC (Application Specific Integrated Circuit) or a FPGA (Field-Programmable Gate Array).

For example, in the case where the functions for performing the series of processes described above are fulfilled by using software, a program that is included in the software is install in a computer via a network or a recording medium. In this case, the computer may be a computer into which exclusive hardware is incorporated or may be a general-purpose computer (for example, a typical electronic device such as a general-purpose personal computer) that can perform a predetermined function by installing a program. Steps of a written program may include only processes that are sequentially performed in time series and may include processes that are performed in parallel or processes that are separately performed. The steps of the written program may be performed in a freely selected order without departing from the spirit of the present invention.

The recording medium in which the program is recorded may be provided to a user by being distributed separately from the computer or may be provided to a user with the recording medium incorporated into the computer in advance. In this case, examples of the removable media 101 and the removable media 102, recording medium that is distributed separately from the computer include a magnetic disk (including a floppy disk), an optical disk, and a magneto-optical disk. Examples of the optical disk include a CD-ROM (Compact Disc-Read Only Memory), a DVD (Digital Versatile Disc), and a Blu-ray (register trademark) Disc (a Blu-ray Disc). Examples of the magneto-optical disk include a MD (Mini Disc). Examples of the recording medium that is provided to a user in a state that is pre-installed in the computer main body is, for example, the storage unit 42 or the storage unit 52 in which programs are recorded, such as an HDD (hard disk drive) or an SSD (Solid State Drive). Drive).

REFERENCE SIGNS LIST 10-1, . . . , 10-h first drive device, 11, 21 driver, 12, 22 actuator, 13, 23 position sensor, 15 first mechanism, 20-1, . . . , 20-i second drive device, 25 second mechanism, 30-1, . . . , 30-j control device, 31, 45, 55 communication unit, 32 integrated circuit, 40, . . . , 40-k client system, 41, 51 processor, 42, 52 storage unit, 43, 53 ROM, 44, 54 RAM, 46, 56 input unit, 47, 57 output unit, 48, 58 drive, 50 function management system, 101, 102 removable medium, 321 force tactile sensation controller, 411 process request unit, 412, 514 data management unit, 413 browser unit, 414, 516 simulation unit, 415 remote operating unit, 421, 521 time-series data storage unit, 422, 522 model data storage unit, 511 API provision unit, 512 request receiving unit, 513 function assignment unit, 515 model generation unit, 517 relay monitoring unit, CS control target system, FT force velocity assignment transformation block, FC ideal force source block, PC ideal velocity (position) source block, IFT reverse transformation block, N network, S information processing system

The invention claimed is:

1. A function management system communicatively connected to a client system, comprising:

a request receiver that, when there exist a plurality of processes based on a control parameter for transmitting force tactile sensation between a master device and a slave device, receives an execution request for one process of the plurality of processes; and an assigner that identifies functions required to execute a process content of the one process of the plurality of processes for which the execution request was received by the request receiver, assigns each of the identified functions to either hardware of the client system or hardware of the function management system, and causes the hardware to which the identified function is assigned to implement the identified function.

2. The function management system according to claim 1, wherein the assigner performs the assignment based on the identified functions required to execute the process content of the one process of the plurality of processes for which the execution request was received by the request receiver, an available resource of the hardware of the client system, and an available resource of the hardware of the function management system.

3. The function management system according to claim 1, wherein the assigner performs the assignment based on the functions required to execute the process content of the one process of the plurality of processes for which the execution request was received by the request receiver, and whether or not there exists the master device or the slave device that is a target device for transmission of force tactile sensation based on the control parameter as the hardware of the client system.

4. A function management method performed by a function management system communicatively connected to a client system, the function management method comprising:

receiving, when there exist a plurality of processes based on a control parameter for transmitting force tactile sensation between a master device and a slave device, an execution request for one process of the plurality of processes; and identifying functions required to execute a process content of the one process of the plurality of processes for which the execution request was received, assigning each of the identified functions to either hardware of the client system or hardware of the function management system, and causing the hardware to which the identified function is assigned to implement the function.

5. A non-transitory storage medium encoded with a computer-readable program that controls a processor of a computer included in a function management system communicatively connected to a client system to execute processes including:

receiving, when there exist a plurality of processes based on a control parameter for transmitting force tactile sensation between a master device and a slave device, an execution request for one process of the plurality of processes; and identifying functions required to execute a process content of the one process of the plurality of processes for which the execution request was received, assigning each of the identified functions to either hardware of the client system or hardware of the function management system, and causing the hardware to which the identified function is assigned to implement the function.

6. The function management system according to claim 1, wherein either one, or both, of the hardware of the client system and the hardware of the function management system implements, or implement, a function of storing time-series data of the control parameter and a function of operating as a virtual master device or a virtual slave device by reproducing operation based on the stored time-series data of the control parameter, based on the assignment by the assigner.

7. The function management system according to claim 6, wherein the function of storing the time-series data of the control parameter is a function of storing time-series data of the control parameter that was previously sent and received between the master device and the slave device.

8. The function management system according to claim 1, wherein the request receiver receives the execution request for the one process of the plurality of processes from the client system.

9. The function management system according to claim 1, wherein the request receiver receives the execution request for the one process of the plurality of processes based on operation instructions of a user to an input unit.

10. The function management system according to claim 1, wherein the assigner causes the hardware to which the identified function is assigned to implement the function such that the force tactile sensation transmission is performed when the process content of the one process of the plurality of processes for which the execution request was received by the request receiver is executed.

11. The function management system according to claim 1, wherein the plurality of processes are diverse such that the process content of the plurality of processes is different and the functions required to execute the process content of the plurality of processes differ.

12. The function management system according to claim 1, wherein depending on which one process of the plurality of processes is to be executed by the assigner, the assigner dynamically assigns each of the identified functions to the hardware of the client system or the hardware of the function management system.

\* \* \* \* \*